United States Patent
Wasserman et al.

(10) Patent No.: US 12,417,473 B2
(45) Date of Patent: Sep. 16, 2025

(54) CONTENT OUTPUT SYSTEMS USING VEHICLE-BASED DATA

(71) Applicant: Allstate Insurance Company, Northbrook, IL (US)

(72) Inventors: Robert Wasserman, Wheaton, IL (US); Fred Dimesa, Hermosa Beach, CA (US); Bill Yurdin, Sherman Oaks, CA (US)

(73) Assignee: Allstate Insurance Company, Northbrook, IL (US)

( * ) Notice: Subject to any disclaimer, the term of this patent is extended or adjusted under 35 U.S.C. 154(b) by 244 days.

(21) Appl. No.: 18/223,083

(22) Filed: Jul. 18, 2023

(65) Prior Publication Data
US 2023/0360085 A1   Nov. 9, 2023

Related U.S. Application Data

(60) Continuation of application No. 17/479,635, filed on Sep. 20, 2021, now Pat. No. 11,748,780, which is a
(Continued)

(51) Int. Cl.
*G06Q 30/0251* (2023.01)
*E01F 9/00* (2016.01)
(Continued)

(52) U.S. Cl.
CPC .......... *G06Q 30/0265* (2013.01); *E01F 9/00* (2013.01); *G08B 5/00* (2013.01); *G08G 1/0116* (2013.01);
(Continued)

(58) Field of Classification Search
CPC ......... G06Q 30/0265; E01F 9/00; G08B 5/00; G08G 1/0116; G08G 1/012; G08G 1/0141;
(Continued)

(56) References Cited

U.S. PATENT DOCUMENTS

| | | | |
|---|---|---|---|
| 5,214,793 A | 5/1993 | Conway et al. |
| 5,381,155 A | 1/1995 | Gerber |

(Continued)

FOREIGN PATENT DOCUMENTS

| | | |
|---|---|---|
| WO | WO-0143104 A1 | 6/2001 |
| WO | WO-0157763 A1 | 8/2001 |

OTHER PUBLICATIONS

Aug. 14, 2015—(US) Non-Final Office Action—U.S. Appl. No. 14/281,390, 13 pages.

(Continued)

*Primary Examiner* — Curtis A Kuntz
*Assistant Examiner* — James E Munion

(57) ABSTRACT

Electronic display systems, including roadside display devices, vehicle-based devices, personal mobile devices, intermediary servers, advertising servers and/or networks, and/or additional external data sources may operate individually or in combination to identify one or more vehicle locations, driving routes, driver and passenger characteristics, driving behavior and patterns, telematics data, and the like. Vehicle and individual characteristics and/or telematics data may be determined based on data received from traffic cameras, vehicle-based devices, personal mobile devices, telematics devices, and/or other data sources, including software applications. Based on the vehicle characteristics, individual characteristics, driving data and driving patterns, telematics data, and the like, content, such as digital display content or audio content, may be determined for output on various devices, such as electronic roadside displays to be (Continued)

viewable by the approaching vehicles, and/or other devices to be accessible by associated individuals via the other devices. Various techniques may be used to determine customized content. Additionally, certain systems may be interactive to allow user responses and follow-up content via on-board vehicle devices or other user devices.

20 Claims, 18 Drawing Sheets

Related U.S. Application Data continuation of application No. 16/448,441, filed on Jun. 21, 2019, now Pat. No. 11,127,042, which is a continuation of application No. 16/183,158, filed on Nov. 7, 2018, now Pat. No. 10,380,642, which is a continuation of application No. 15/982,654, filed on May 17, 2018, now Pat. No. 10,423,982, which is a continuation-in-part of application No. 15/267,771, filed on Sep. 16, 2016, now Pat. No. 10,133,530, which is a continuation-in-part of application No. 15/018,101, filed on Feb. 8, 2016, now Pat. No. 9,536,428, which is a division of application No. 14/281,390, filed on May 19, 2014, now Pat. No. 9,293,042.

(51) Int. Cl.
| | |
|---|---|
| *G06F 3/14* | (2006.01) |
| *G07C 5/00* | (2006.01) |
| *G07C 5/08* | (2006.01) |
| *G08B 5/00* | (2006.01) |
| *G08G 1/01* | (2006.01) |
| *G08G 1/017* | (2006.01) |
| *G08G 1/04* | (2006.01) |
| *G08G 1/09* | (2006.01) |

(52) U.S. Cl.
CPC ........... *G08G 1/012* (2013.01); *G08G 1/0141* (2013.01); *G08G 1/0175* (2013.01); *G08G 1/04* (2013.01); *G08G 1/093* (2013.01); *G06F 3/14* (2013.01); *G07C 5/008* (2013.01); *G07C 5/0816* (2013.01)

(58) Field of Classification Search
CPC ........ G08G 1/0175; G08G 1/04; G08G 1/093; G06F 3/14; G07C 5/008; G07C 5/0816
See application file for complete search history.

(56) References Cited

U.S. PATENT DOCUMENTS

| | | | |
|---|---|---|---|
| 6,587,755 | B1 | 7/2003 | Smith et al. |
| 7,882,653 | B2 | 2/2011 | Barlow |
| 9,293,042 | B1 | 3/2016 | Wasserman |
| 9,536,428 | B1 * | 1/2017 | Wasserman ...... H04N 21/41415 |
| 9,581,461 | B1 | 2/2017 | Chintakindi et al. |
| 10,051,306 | B1 | 8/2018 | Wasserman |
| 10,133,530 | B2 | 11/2018 | Wasserman |
| 10,341,709 | B1 | 7/2019 | Wasserman |
| 10,380,642 | B2 | 8/2019 | Wasserman et al. |
| 10,423,982 | B2 | 9/2019 | Wasserman et al. |
| 10,545,711 | B2 | 1/2020 | Wasserman |
| 10,582,248 | B2 | 3/2020 | Wasserman |
| 11,037,177 | B1 * | 6/2021 | Chan ..................... G06Q 40/03 |
| 11,623,564 | B2 * | 4/2023 | Switalski ............... G08G 1/052 340/425.5 |
| 11,748,780 | B2 * | 9/2023 | Wasserman ...... G08G 1/096741 340/905 |
| 2003/0004806 | A1 | 1/2003 | Vaitekunas |
| 2003/0220866 | A1 | 11/2003 | Pisaris-Henderson et al. |
| 2005/0021393 | A1 | 1/2005 | Bao et al. |
| 2005/0088320 | A1 | 4/2005 | Kovach |
| 2006/0229939 | A1 | 10/2006 | Bhakta et al. |
| 2008/0089288 | A1 | 4/2008 | Anschutz et al. |
| 2010/0002079 | A1 | 1/2010 | Krijn et al. |
| 2010/0223112 | A1 | 9/2010 | Griffin et al. |
| 2011/0010228 | A1 | 1/2011 | Goto |
| 2011/0093330 | A1 | 4/2011 | Burckart et al. |
| 2012/0029964 | A1 | 2/2012 | Tengler et al. |
| 2012/0054028 | A1 | 3/2012 | Tengler et al. |
| 2012/0290150 | A1 | 11/2012 | Doughty et al. |
| 2013/0060642 | A1 | 3/2013 | Shlomot |
| 2014/0046701 | A1 | 2/2014 | Steinberg et al. |
| 2014/0122220 | A1 | 5/2014 | Bradley et al. |
| 2014/0214543 | A1 | 7/2014 | Gandhi |
| 2015/0051787 | A1 | 2/2015 | Doughty et al. |
| 2015/0120961 | A1 | 4/2015 | Mao et al. |
| 2015/0332623 | A1 | 11/2015 | Cheatham, III et al. |
| 2015/0339780 | A1 | 11/2015 | Collopy et al. |
| 2016/0198306 | A1 | 7/2016 | Miles et al. |
| 2017/0255966 | A1 | 9/2017 | Khoury |
| 2018/0025554 | A1 | 1/2018 | Gibson et al. |
| 2018/0082379 | A1 | 3/2018 | Kelsh et al. |
| 2019/0043088 | A1 | 2/2019 | Garcia et al. |
| 2019/0121628 | A1 | 4/2019 | Hu et al. |
| 2019/0392367 | A1 | 12/2019 | Gara et al. |

OTHER PUBLICATIONS

Dec. 4, 2015—(US) Notice of Allowance—U.S. Appl. No. 14/281,390, 5 pages.

Aug. 29, 2016—(US) Notice of Allowance—U.S. Appl. No. 15/018,101, 7 pages.

May 13, 2016—(US) Non-Final Office Action—U.S. Appl. No. 15/018,101, 14 pages.

Oct. 4, 2017—(US) Notice of Allowance—U.S. Appl. No. 15/355,368, 15 pages.

Dec. 21, 2018—(US) Non-Final Office Action—U.S. Appl. No. 15/982,654, 22 pages.

Dec. 21, 2018—(US) Non-Final Office Action—U.S. Appl. No. 16/183,158, 17 pages.

Feb. 16, 2018—(US) Non-Final Office Action—U.S. Appl. No. 15/267,771, 19 pages.

Jan. 26, 2018—(US) Notice of Allowance—U.S. Appl. No. 15/355,368, 9 pages.

Jul. 19, 2018—(US) Supplemental Notice of Allowability—U.S. Appl. No. 15/267,771, 6 pages.

Jul. 6, 2018—(US) Notice of Allowance—U.S. Appl. No. 15/267,771, 11 pages.

Jun. 8, 2018—(US) Non-Final Office Action—U.S. Appl. No. 15/355,396, 18 pages.

Nov. 28, 2018—(US) Notice of Allowance—U.S. Appl. No. 16/152,833, 16 pages.

Oct. 26, 2018—(US) Notice of Allowance—U.S. Appl. No. 15/355,396, 18 pages.

Apr. 3, 2019—(US) Notice of Allowance—U.S. Appl. No. 16/183,158, 11 pages.

Aug. 28, 2019—(US) Notice of Allowance—U.S. Appl. No. 16/152,833, 25 pages.

Feb. 11, 2019—(US) Notice of Allowance—U.S. Appl. No. 15/355,396, 9 pages.

Jul. 8, 2019—(US) Non-Final Office Action—U.S. Appl. No. 16/410,239, 15 pages.

May 10, 2019—(US) Notice of Allowance—U.S. Appl. No. 15/982,654, 14 pages.

May 21, 2019—(US) Notice of Allowance—U.S. Appl. No. 16/152,833, 13 pages.

Oct. 23, 2019—(US) Notice of Allowance—U.S. Appl. No. 16/410,239, 14 pages.

Aug. 7, 2020—(US) Non-Final Office Action—U.S. Appl. No. 16/448,441, 28 pages.

Jul. 8, 2020—(US) Notice of Allowance—U.S. Appl. No. 16/701,387, 10 pages.

(56) References Cited

OTHER PUBLICATIONS

Jun. 23, 2020—(US) Notice of Allowance—U.S. Appl. No. 16/786,233, 10 pages.
Mar. 16, 2020—(US) Non-Final Office Action—U.S. Appl. No. 16/786,233, 15 pages.
Mar. 26, 2020—(US) Non-Final Office Action—U.S. Appl. No. 16/701,387, 17 pages.
May 21, 2020—(CA) Office Action—App. No. 3037294, 3 pages.
Apr. 1, 2021—(CA) Office Action—App. No. 3037294, 4 pages.
"Digital Outdoor Advertising Billboard That Recognizes Your Car," ENGAGIS, Copyright 2014, Retrieved from URL: http://engagis.com/digital-outdoor-advertising-billboard-that-recognizes-your-car/ , Accessed on Dec. 3, 2014, 2 pages.
Geiger H.L., "A Framework for Digital Signage Privacy," Center for Democracy & Technology (CDT), Mar. 1, 2010, 15 pages.
Hall C., "Mini drivers take a spin on DOOH," DigitalSignageToday.com , Published on Sep. 10, 2013, Retrieved from URL: http://www.digitalsignagetoday.com/article/219229/Mini-drivers-take-a-spin-on-DOOH , Accessed on Dec. 3, 2014, 4 pages.
International Preliminary Report on Patentability for International Application No. PCT/US2017/051762, mailed Mar. 28, 2019, 8 Pages.
International Preliminary Report on Patentability for International Application No. PCT/US2019/032905, mailed Nov. 26, 2020, 5 Pages.
International Search Report and Written Opinion for International Application No. PCT/US2019/032905, mailed Jun. 28, 2019, 6 Pages.
International Search Report for International Application No. PCT/US2017/051762, mailed Nov. 20, 2017, 3 Pages.
Luan T.H., et al., "VTube: Towards the Media Rich City Life with Autonomous Vehicular Content Distribution," Institute of Electrical and Electronics Engineers (IEEE), Jun. 27-30, 2011, 9 pages.
Nandan A., et al., "AdTorrent: Digital Billboards for Vehicular Networks," Computer Science Department, University of California Los Angeles, Los Angeles, CA, May 30, 2005, 20 pages.
Salladay R., "High-tech Billboards Tune in to Driver's Tastes/ Roadside Signs Coming to Bay Area Listen to Car Radios, Then Adjust Pitch," SFGate, Pubished on Dec. 22, 2002, Retrieved from URL: http://www.sfgate.com/bayarea/article/High-tech-billboards-tune-in-to-drivers-astes-2744204.php , Accessed on Dec. 3, 2014, 3 pages.
Written Opinion for International Application No. PCT/US2017/051762, mailed Nov. 20, 2017, 6 Pages.

\* cited by examiner

CONTENT OUTPUT SYSTEMS USING VEHICLE-BASED DATA

CROSS REFERENCE TO RELATED APPLICATIONS

This application is a continuation of and claims priority to U.S. patent application Ser. No. 17/479,635 filed Sep. 20, 2021, and entitled "Content Output Systems Using Vehicle-Based Data," which is a continuation of and claims priority to U.S. patent application Ser. No. 16/448,441 filed Jun. 21, 2019, and entitled "Content Output Systems Using Vehicle-Based Data," which is a continuation of U.S. patent application Ser. No. 16/183,158 filed Nov. 7, 2018, and entitled "Content Output Systems Using Vehicle-Based Data," which is a continuation of U.S. patent application Ser. No. 15/982,654 filed May 17, 2018, and entitled "Content Output Systems Using Vehicle-Based Data," which is a continuation-in-part of U.S. patent application Ser. No. 15/267,771, now U.S. Pat. No. 10,133,530, filed Sep. 16, 2016, and entitled "Electronic Display Systems Connected to Vehicles and Vehicle-Based Systems," which is a continuation-in-part of U.S. patent application Ser. No. 15/018,101, now U.S. Pat. No. 9,536,428, filed Feb. 8, 2016, and entitled "Electronic Display Systems Connected to Vehicles and Vehicle-Based Systems," which is a divisional of U.S. patent application Ser. No. 14/281,390, now U.S. Pat. No. 9,293,042, filed May 19, 2014, and entitled "Electronic Display Systems Connected to Vehicles and Vehicle-Based Systems." Each of these applications is incorporated herein by reference in its entirety herein.

TECHNICAL FIELD

Various aspects of the disclosure relate to determining and providing content, such as digital content, audio content, etc., for output to various devices, such as electronic display devices, based on vehicle data, individual data, driving data, and the like. More specifically, aspects of the disclosure relate to systems and methods for receiving vehicle characteristics, individual characteristics, and driving data from various sources corresponding to current and previous driving trips, user interests or habits, driving behavior, vehicle operation data, and the like, and determining and providing content via various devices, such as electronic roadside displays, other display devices, mobile devices, etc.

BACKGROUND

Roadside displays are commonly used as billboard advertisements, traffic signs, safety warning signs, and the like. Governmental entities may install street signs, speed limit signs, warnings for hazardous road conditions, and directional or navigational signs. Additionally, advertisers may purchase or lease roadside billboards for certain periods of time. Although roadside displays have been traditionally non-digital (i.e., wooden and metal signs and billboards), more recent roadside displays now may be partially or entirely digital, such as programmable speed limit signs, electronic traffic warning signs, and digital billboards. Accordingly, it would be advantageous to customize content provided to a user based on user interests, habits, vehicle data, driving behavior, and the like. The customized content may be distributed through advertising servers and/or networks.

In some arrangements, electronic roadside displays might not be arranged in a location desired for display of content. In other examples, the position of the electronic roadside display might not be ideal for displaying determined customized content. Accordingly, it may be advantageous to dynamically select a channel for distributing the determined content to a user. For example, a mobile device associated with a driver of the vehicle, an on-board display device of the vehicle, or another device may be selected for distributing the determined content. In this case, the determined content may be provided to the selected device at any point during the user's trip or at a later time.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses of content output systems for determining and providing customized content via various devices, based on the characteristics of vehicles and individuals associated with the vehicles and/or based on telematics data. The telematics data may include data such as vehicle operation and driving data and such data may be acquired from various sources, such as telematics applications installed on a mobile device of a user. The determined customized content may be provided to various devices, such as roadside displays, portable computing devices, televisions, game consoles, etc., for output to a user. The content may be visual content and may be provided to be output for display on the device. The content may be audio content and may be provided for output through a speaker associated with the device. The content may further be a combination of visual and audio content. In various examples and embodiments, the content output systems may include one or more output devices, e.g., roadside display devices and/or other digital display devices, on-board vehicle devices, mobile devices, televisions, home computing devices, set-top boxes, game consoles, radios, etc., intermediary servers, advertising servers, and/or networks, and/or additional external data sources configured to operate individually or in combination.

Some aspects of the disclosure relate to collecting data from one or more vehicles or individuals approaching an electronic roadside display device or other display device. The one or more vehicles or individuals approaching an electronic roadside display device or other display device may be identified, for example, using on-board vehicle devices, traffic cameras, personal mobile devices, and other devices in a content output system. Characteristics of the approaching vehicles, individuals associated with the approaching vehicles, driving data, driving patterns, and/or other data may be retrieved and analyzed in order to determine the digital content to be displayed on the display devices.

Additional aspects of the disclosure relate to retrieving telematics data, such as driving behavior, driving patterns, and/or vehicle operation data, collected from various sources, such as by one or more applications installed on a mobile device of the user. For example, a user may opt-in to allow data to be retrieved from one or more user applications that collect telematics. The data may be retrieved and analyzed in order to determine the content to be provided to the user and also to identify one or more devices to which to provide and output the digital content. Telematics data may be retrieved from other sources as well, such as from a telematics server which collects, stores, analyzes, and processes telematics data.

In various cases, the determined content may correspond to a targeted advertisement, vehicle maintenance suggestion, driving safety warning, or other customized message based on the characteristics of the associated vehicles and individuals, the user data, and/or telematics data.

Additional aspects of the disclosure relate to retrieving and analyzing characteristics from multiple different vehicles and individuals, including aggregating and/or prioritizing certain characteristics or other data when selecting a targeted advertisement or message. In some examples, a real-time auction software application may allow multiple different advertisers to compete for digital advertising times based on the identified characteristics of the associated vehicles and individuals, the user data, and/or the telematics data.

Still other aspects of the disclosure relate to interactive systems in which users may provide responses to the content output via roadside displays and/or other display devices, for example, using vehicle-based devices or personal mobile devices. User responses to the initially output content may be used to select follow-up content, which may be transmitted for output to one or more target devices. Additional aspects discussed herein are related to retrieving data associated with a user, such as calendar or appointment data, and using that information to generate or determine content and also to identify one or more devices on which to output the generated content. For instance, if appointment data includes an address of an appointment, a display located near the address may be selected and the generated content may be transmitted to that device and displayed.

Other aspects described herein are directed to arrangements in which generated content may be transmitted to a device, such as a mobile device, associated with a passenger in a vehicle in order to provide increased safety in transmitting content to a user. In some examples, content may be transmitted to and/or output on multiple devices.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
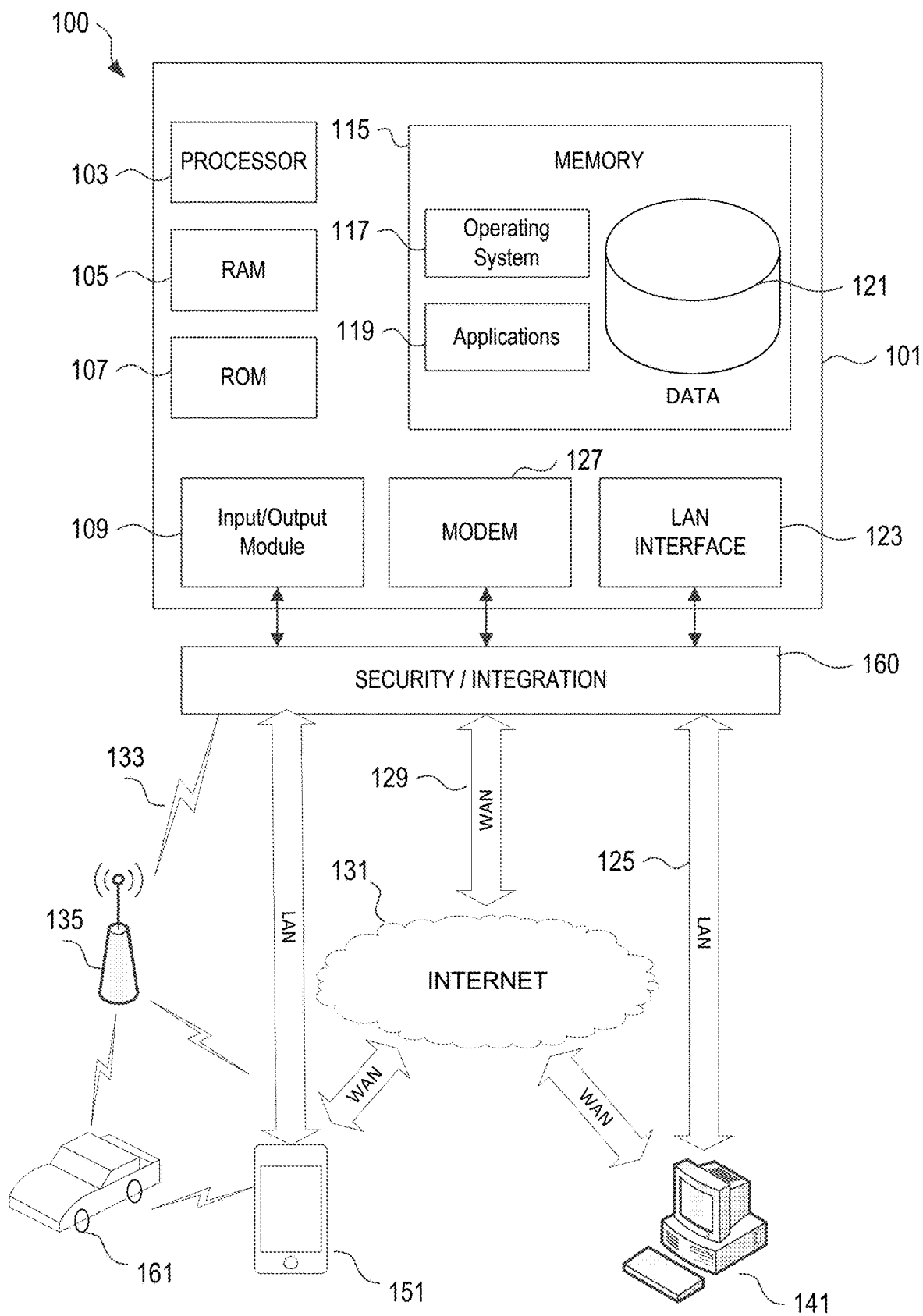
FIG. 1 illustrates computing systems and a network environment that may be used to implement aspects of the disclosure.

FIG. 1 illustrates a block diagram of a computing device (or system) 101 in a computer system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141 and 151, security and integration hardware 160) may correspond to any of multiple systems or devices described herein, such as content output systems (e.g., digital billboards, roadside signs, and other outdoor digital displays), mobile devices, televisions, set-top boxes, on-board vehicle computing systems, intermediary server systems, external data source systems, and the like. These various computing systems may be configured individually or in combination, as described herein, for identifying vehicles approaching electronic displays or particular locations (e.g., residence, parking lot, work location, etc.), retrieving and/or determining various vehicle and individual (e.g., driver or passenger) characteristics of the associated vehicles, retrieving user data (e.g. calendar or appointment data), retrieving telematics data, and determining digital content or other content for the electronic roadside displays and other display devices, based on the characteristics of the associated vehicles and individuals, the user data, and/or the telematics data.

Input/Output (I/O) 109 may include a microphone, keypad, touch screen, and/or stylus through which a user of the computing device 101 may provide input, and may also include one or more of a speaker for providing audio output and a video display device for providing textual, audiovisual, and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer-readable instructions, data structures, program modules or other data. Certain devices and systems within content output systems may have minimum hardware requirements in order to support sufficient storage capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 101 (e.g., an electronic display device 101, intermediary server device 101, on-board vehicle system 101, etc.), in order to identify vehicles near or on-route to electronic roadside displays or other digital displays, locations such as residence, work location or office, parking lot, etc., determine various characteristic of the vehicles or passengers, determine digital content for the electronic roadside displays and other display devices, determine a length of time for which the content will be displayed, etc. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the system 101 to execute a series of computer-readable instructions, for example, to identify vehicles at specific locations, retrieve or determine vehicle or passenger characteristics, retrieve user and/or telematics data, and determine digital or other content for output to various devices, such as electronic roadside displays or other display devices.

The computing device 101 (e.g., a content output system, intermediary server, on-board vehicle system or mobile device, content determination and display server, etc.) may operate in a networked environment 100 supporting connections to one or more remote computers, such as terminals 141, 151, and 161. Such terminals may be personal computers or server 141 (e.g., home computers, laptops, web servers, database servers), mobile communication devices 151 (e.g., mobile phones, tablet computers, etc.), vehicle-based computing systems 161 (e.g., on-board vehicle systems, telematics devices, mobile phones or other personal mobile devices within vehicles), and the like, each of which may include some or all of the elements described above with respect to the computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 151 and 161 (e.g., mobile phones, portable customer computing devices, on-board vehicle computing systems, etc.) via one or more network devices 135 (e.g., base transceiver stations) in the wireless network 133.

Also illustrated in FIG. 1 is a security and integration layer 160, through which communications are sent and managed between the device 101 (e.g., a content output system, an intermediary server, a user computer or mobile computing device, a content determination and display server, etc.) and the remote devices (141, 151, and 161) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 160 of a server 101 may comprise a set of web application servers configured to use secure protocols and to insulate the server 101 from external devices 141, 151, and 161. In some cases, the security and integration layer 160 may correspond to a set of dedicated hardware and/or software operating at the same physical location and under the control of same entities as device 101. For example, layer 160 may correspond to one or more dedicated web servers and network hardware in a vehicle and driver information datacenter or in a cloud infrastructure supporting a cloud-based vehicle identification and vehicle and driver data retrieval and analysis. In other examples, the security and integration layer 160 may correspond to separate hardware and software components which may be operated at a separate physical location and/or by a separate entity.

As discussed below, the data transferred to and from various devices in a content output system 100 may include secure and sensitive data, such as confidential vehicle data, insurance data, and personal user data from drivers and passengers. Therefore, it may be desirable to protect transmissions of such data by using secure network protocols and encryption, and also to protect the integrity of the data when stored on or within a content output system, intermediary server, external data source servers, user devices, on-board vehicle devices, content determination and display server, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in a content output system 100. Data may be transmitted through the security and integration layer 160, using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 160. The web services may be accessed by authorized external devices and users to support input, extraction, and manipulation of the data (e.g., vehicle and passenger data) between the various devices 101 in the system 100. Web services built to support a content output system may be cross-domain and/or cross-platform, and may be built for enterprise use. Such web services may be developed in accordance with various web service standards, such as the Web Service Interoperability (WS-I) guidelines. In some examples, a vehicle or individual data analysis web service, a digital content determination or offer web service, or an advertiser auction web service may be implemented in the security and integration layer 160 using the Secure Sockets Layer (SSL) or Transport Layer Security (TLS) protocol to provide secure connections between servers 101 and various clients 141, 151, and 161 (e.g., user mobile devices, vehicle-based devices, or other computing devices). SSL or TLS may use HTTP or HTTPS to provide authentication and confidentiality. In other examples, such web services may be implemented using the WS-Security standard, which provides for secure SOAP messages using XML, encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a database of vehicle or passenger-related data from various data sources) is cached in a separate smaller database on an application server separate from the database server (e.g., at an intermediary server, advertising servers and/or networks, electronic roadside display, content determination and display server, or other display device). For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of content output systems, such as faster response times and less dependence on network conditions when transmitting/receiving information to identify vehicles, retrieve vehicle and individual data, and determine digital or other content to provide to vehicles, etc.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and content output systems components described herein may be configured to communicate using any of these network protocols or technologies.

Additionally, one or more application programs 119 may be used by the various computing devices 101 within a content output system 100 (e.g., vehicle or individual data analysis software applications, telematics software applications, advertiser auction software applications, content determination and display software applications, etc.), including computer executable instructions for identifying vehicles approaching electronic displays, retrieving and/or determining various vehicle and individual characteristics of the approaching vehicles, retrieving and analyzing user data (e.g., calendar or appointment data), retrieving and analyzing telematics data, scoring a user's telematics data, determining and providing digital or other content on various devices, such as electronic displays, based on the characteristics of the approaching vehicles and individuals and/or the retrieved data.

Figure 2A:
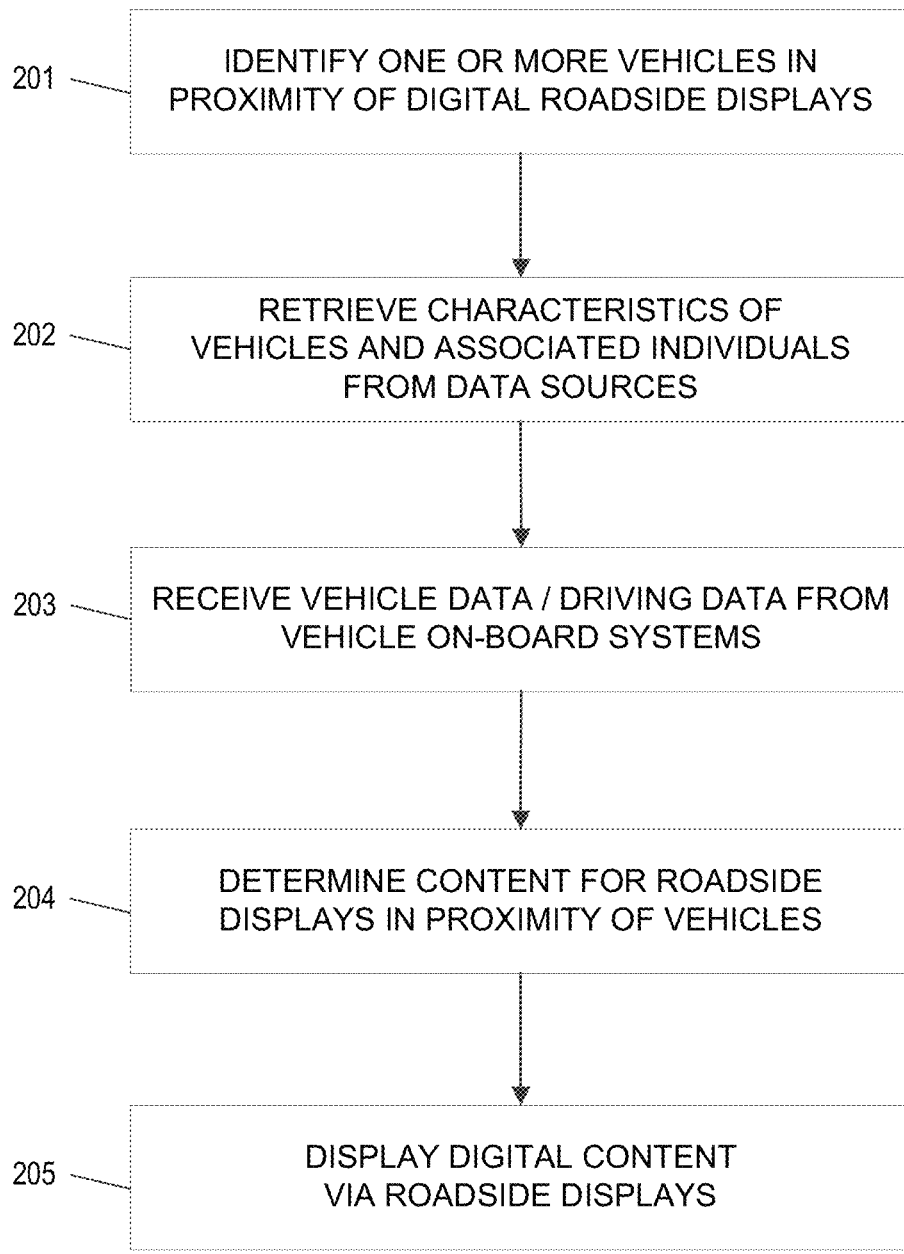
FIG. 2A is a flow diagram illustrating an example method of displaying digital content via roadside displays based on vehicle and individual characteristics and/or driving data, according to one or more aspects of the disclosure.
Figure 2B:
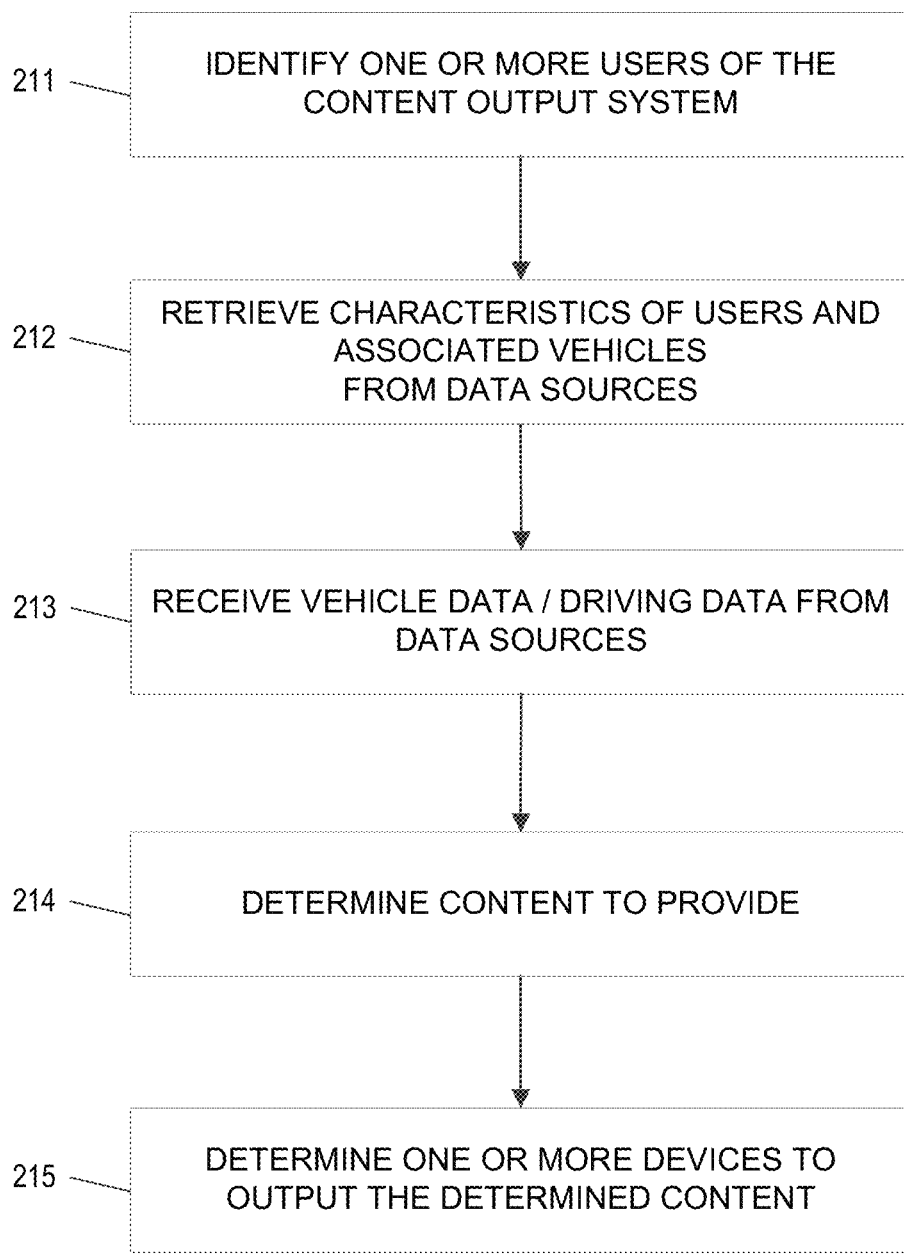
FIG. 2B is a flow diagram illustrating an example method of providing content via a personal mobile computing device, based on vehicle and individual characteristics and/or driving data, according to one or more aspects of the disclosure.
Figure 2C:
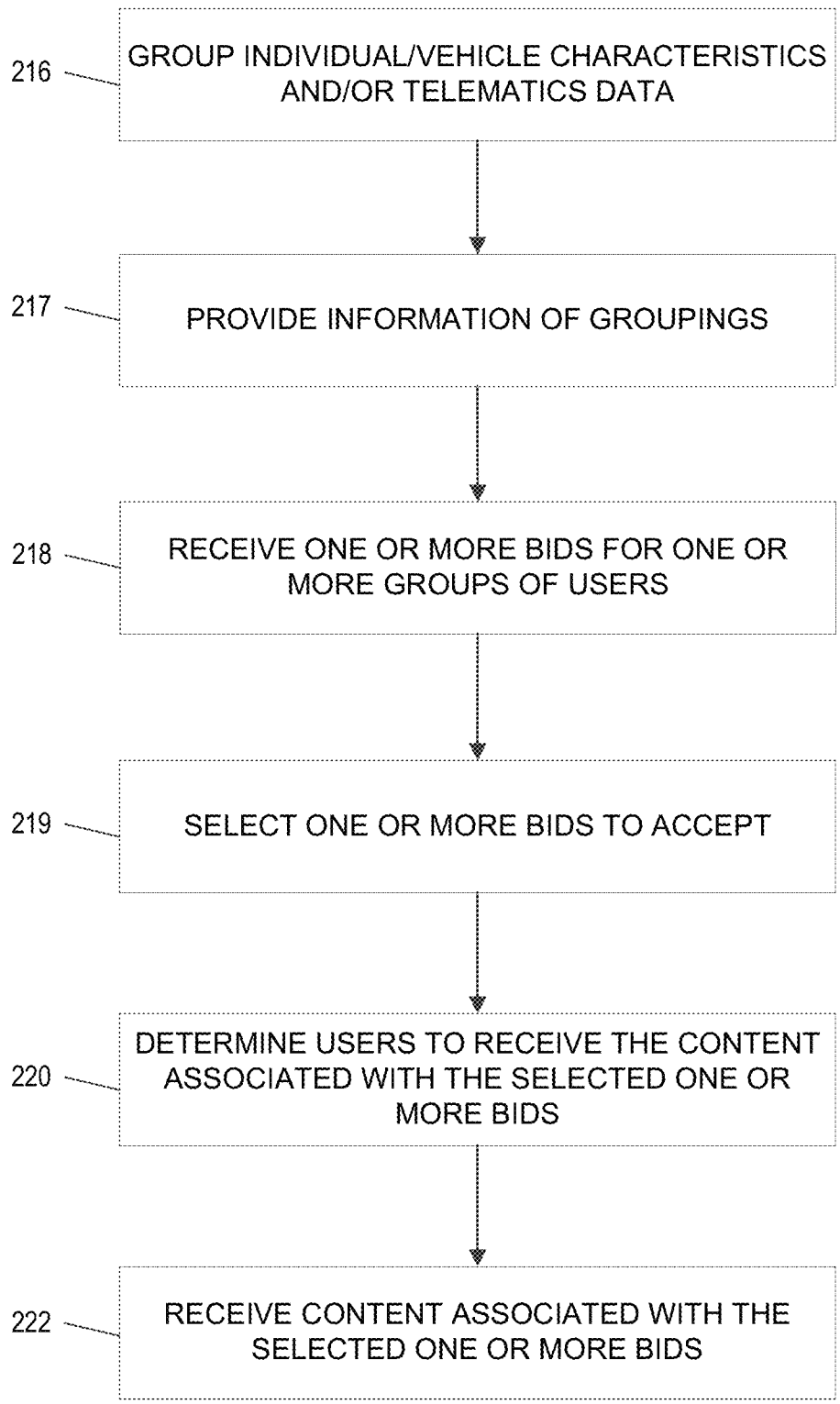
FIG. 2C is a flow diagram illustrating an example method of determining content, according to one or more aspects of the disclosure.

FIG. 2A is a flow diagram illustrating an example method of a content output system displaying digital content via roadside displays, based on the characteristics of one or more approaching vehicles and/or associated individuals. FIG. 2B is a flow diagram illustrating an example method of a content output system outputting content via a personal mobile computing device of an individual, based on characteristics of the individual, characteristics of a vehicle associated with the individual, and driving data associated with the individual. FIG. 2C is a flow diagram illustrating an example method of determining content, according to one or more aspects of the disclosure. The various embodiments and examples described in connection with FIGS. 2A-2C may be implemented using a number of computing systems, operating individually or in combination, such as electronic roadside displays, on-board vehicle systems, intermediary servers, advertising servers and/or networks, mobile devices, and other computing devices. Different examples of components and configurations for content output systems are shown in FIGS. 3A-3E, described below. Each of computing devices and systems in these examples may include some or all of hardware, software, and networking components as the illustrative computing device 101 described in FIG. 1.

Referring to FIG. 2A, in step 201, one or more vehicles are identified as being in the proximity of one or more electronic roadside displays. The identification of a vehicle in step 201 may be based on a determination that the vehicle is currently near or approaching an electronic roadside display, or that the vehicle is likely to be near the electronic roadside display at some future point in time. Accordingly, the identification of a vehicle in step 201 may include receiving or determining the current locations, speeds, directions of travel, roads and routes being driven, and intended or anticipated destinations for a number of vehicles. This data may be analyzed and compared to the locations of the electronic roadside displays (e.g., LED billboards and other electronic signs) that are controllable by the content output system.

Determinations that a vehicle is near or approaching an electronic roadside display, or that it will be near an electronic roadside display in the near future, may be performed in various different ways, either by a single computing device or a combination of multiple devices in the content output system. For example, a computing device or system positioned along a roadside may use cameras, motion sensors and proximity sensors to detect the approach of a vehicle and retrieve identifying information for the vehicle and/or passengers. For instance, a roadside motion detector and camera system located at or near electronic roadside display may be able to detect approaching vehicles and receive vehicle-specific identification information, such as the vehicle's license plate number and state, VIN, registration tag, etc.

In other examples, one or more on-board vehicle computing devices, such as vehicle console computing systems, vehicle navigation systems, vehicle diagnostic systems, vehicle telematics devices, and the personal mobile devices of drivers and passengers in the vehicle, may be used to determine vehicle location, speed, direction, roads/routes being driven, and destination. An on-board vehicle system may be configured with vehicle-to-vehicle (V2V) or vehicle-to-infrastructure (V2I) communication capabilities, and may communicate with other vehicles or roadside computing devices via digital short-range communication (DRSC) or other communication protocols to indicate its position, speed, direction, etc. On-board or vehicle-based systems may include in-vehicle electronics, plug-in vehicle electronics and accessories, and/or after-market devices, such as vehicle navigation systems, telematics devices, on-board devices (OBDs), and the like. The smartphones and other mobile devices of drivers or passengers also may include Global Positioning System (GPS) receivers or other location-based services (LBS) capable of determining vehicle location, speed, and/or direction, etc. Other wireless technologies, such as mobile communication networks, Wi-Fi, and Bluetooth, also may be used to determine vehicle locations, speeds, and directions, etc. In some cases, on-board vehicle computing systems may transmit the vehicle's location, speed, direction, and other data over short distances to nearby electronic roadside displays to indicate that the vehicle is approaching the electronic display. In other examples, on-board vehicle computing systems may transmit the vehicle's location, speed, direction, and other data to intermediary servers and other communication networks that may collect and analyze the information to identify one or more electronic roadside displays that the vehicle is approaching.

In addition to a vehicle's current location, speed, and direction data, additional data from on-board computer systems, driver or passenger mobile devices, or other data sources, may be received and analyzed in step 201 to make longer-ranging predictions about the future positions of the vehicle. For example, a vehicle navigation system or a user's smartphone may contain the current trip destination. Additionally, vehicle telematics devices or other systems internal or external to the vehicle may store driving pattern data and previous driving trip logs, from which the current trip destination may be determined. After determining a likely destination of the current driving trip, the destination can be transmitted and analyzed to identify one or more electronic roadside displays that the vehicle is likely to encounter during the driving trip. For example, if a driver inputs a current destination into a vehicle's navigation system (or their smartphone), or if a pattern analysis of the previous driving trips for the vehicle and/or driver can be used determine the destination of the current driving trip, then the anticipated driving route may be analyzed to identify electronic displays along the route and the anticipated time that the vehicle will arrive at each electronic display.

In step 202, for the vehicles identified in step 201, one or more data sources may be accessed to retrieve characteristics of the vehicles (e.g., make, model, color, operational data, etc.) and various individuals associated with the vehicles (e.g., drivers, passengers, owners, etc.). As discussed in more detail below, the vehicle and individual characteristics retrieved in step 202 may be used in step 204 to determine the digital or other content (e.g., an advertisement or other message) to present to the vehicle via the electronic roadside displays. Therefore, the vehicle and individual characteristics retrieved in step 202 may include demographic data, financial data, insurance data, educational data, family data, personal data, and other types of relevant data that may be retrieved from various data sources. Several examples of data sources, and the types of data that may be retrieved from the example data sources, are described below in connection with FIG. 6.

The vehicle data retrieved in step 202 may be based on vehicle identifier information captured by roadside cameras (e.g., a vehicle's license plate data) or transmitted by an on-board vehicle device (e.g., vehicle registration data, VIN, or vehicle identifier transmitted during a V2V or V2I communication). Based on the vehicle identifier information, one or more data sources may be accessed to retrieve additional vehicle-specific data, such as the vehicle's make and model, last recorded mileage, maintenance history, emissions history, estimated value, registered owners, and other insured drivers.

The individual data retrieved in step 202 may correspond to the current occupants of the vehicles identified in step 201

(e.g., drivers and passengers), or individuals otherwise associated with the vehicles (e.g., vehicle owners, family members, other drivers, etc.). In some cases, the relevant individuals may be determined based on the retrieved vehicle data. For example, a vehicle identifier (e.g., license plate, VIN, etc.) may be used to identify the vehicle's owners, other drivers, and family members that may be passengers in the vehicle. In some cases, data identifying the vehicle's occupants also may be transmitted by an on-board vehicle device (e.g., vehicle computer or user's mobile device). For instance, a user may be identified as a driver or passenger in a vehicle based on transmissions from the user's smartphone to another device in the content output system. Additionally, certain vehicle-based computer systems may include the capabilities to detect the identities of the driver and passengers during a driving trip, and may transmit the identities to another device in the content output system. In each of the above examples, after identifying the occupants of the vehicle and/or other individuals associated with the vehicle, one or more data sources may be accessed to retrieve demographic data, financial data, personal data, and the like, for each of the identified individuals.

In some cases, additional data from traffic cameras or other roadside cameras may be used in combination with the vehicle and individual data retrieved from data sources. For example, after accessing an external data source (e.g., an insurance server or governmental vehicle registration server) to determine that a vehicle has two owners, images from roadside cameras may be analyzed to determine which of the two owners, if either, is currently driving. Vehicle sensor data transmitted from an on-board vehicle device (e.g., internal cabin camera data, driver seat settings, radio settings, etc.) also may be used to identify current drivers and passengers.

In step 203, for the vehicles identified in step 201, additional vehicle data and/or driving data may be received from one or more on-board vehicle systems, such as a vehicle-based computing device, a portable computing device of a driver or passenger, or from various other data sources. For example, certain vehicle-based computing devices (e.g., vehicle computers, diagnostic systems, or telematics devices, etc.), personal mobile computing devices (e.g., smartphones or tablet computers of an occupant), and/or various telematics software applications installed on a personal mobile computing device of a user or used by the user may be configured to detect, store, analyze, and/or score various telematics data, such as vehicle maintenance records, vehicle maintenance plans and schedules, vehicle diagnostics data, vehicle impacts, safety warnings, and other data generated by a vehicle's internal computer systems. After being collected, this maintenance and diagnostic data may be transmitted to an electronic roadside display device (e.g., via a V2I protocol), an intermediary computer server (e.g., via a mobile communication network), an advertising server/network, or other device in the content output system.

Additionally, a vehicle-based computing device (e.g., vehicle computers, diagnostic systems, or telematics devices, etc.), a personal mobile computing device (e.g., a smartphone or tablet computer of an occupant), and/or various telematics software applications may be configured to detect, store, analyze, and/or score various telematics data, such as certain driving behaviors and driving patterns, such as speeding or excessively slow driving, swerving, erratic driving, and moving violations committed by the vehicle. These devices and/or applications also may collect driving pattern data for one or more specific vehicles and/or drivers over multiple driving trips. Driving pattern data may include previous driving times, starting points, ending points, and driving routes taken during previous driving trips of a vehicle and/or driver. Additional driving pattern data may include driving behaviors and driving performance metrics, such as average speeds, acceleration and braking patterns, turning and curve handling patterns, turn-signal usage, radio usage, mobile phone usage, and the like.

The telematics data may be analyzed. Driving behaviors and patterns from the current trip may be compared to driving behaviors and patterns from previous trips to determine if the driver is driving hurriedly, cautiously, erratically, or in a high-risk manner compared to the typical driving behaviors and patterns of the driver and/or vehicle.

The telematics data may additionally be scored. For example, a driving score may be calculated to reflect a driving risk or an insurance risk. However, the score need not be risk-related and need not be a driving score. Any number of different types of scores may be calculated based on the collected telematics data. In the case of a driving score, telematics data indicating driving behaviors and patterns showing erratic driving, driving at high speeds, frequent hard breaking, and other unsafe driving habits may result in a low driving score, while telematics data indicating driving behaviors and patterns showing safe driving may result in a high driving score. The driving score may be numeric or non-numeric, such as a number ranging from 1 to 100 or letters ranging from A to F. The driving score may be represented in a variety of different ways, by other numbers or letters, by words, by phrases, etc. The driving scores may be categorized into groups and ranked. As an example, a driving score between 1 to 20 may be considered a low score, a driving score between 21 and 40 may be considered a below average score, a driving score between 41 and 60 may be considered an average score, a driving score between 61 and 80 may be considered an excellent score, and a driving score above 80 may be considered an exceptional score.

After collecting, analyzing, and/or scoring the additional vehicle data and the driving behaviors and driving pattern data, the on-board vehicle devices and/or the personal mobile computing devices may transmit this data to an electronic roadside display device (e.g., via a V2I protocol), an intermediary computer server (e.g., via a mobile communication network), an advertising server and/or network, or other device in the content output system.

In step 204, the vehicle and individual characteristics retrieved from various data sources in step 202, and the vehicle and driving data received from various on-board vehicle systems in step 203, may be analyzed to select specific digital content to display on an electronic roadside display at a specific time. Selected digital content for an electronic roadside display may include, for example, targeted advertisements, vehicle maintenance suggestions, driving safety warnings, and notifications about upcoming driving conditions. In various examples, the digital content determined in step 204 may be based solely on the vehicle and individual characteristics retrieved from one or more data sources in step 202, or solely on the vehicle and driving data received in step 203, or a combination of both types of data.

A portion of the analysis in step 204 may include determining beginning and ending times for specific digital content (e.g., an advertisement or other message) to be displayed on an electronic roadside display. If the digital content is targeted for individuals within a single vehicle, then the beginning display time and ending display time may correspond to the earliest and latest times that content on the roadside display will be visible to the vehicle's occupants. These times may be calculated based on the relative positions and orientations of the vehicle and the electronic roadside display, the speed of the vehicle, the size of the electronic roadside display (including font and image size of the specific content to be displayed), and measurements of the current outdoor visibility (e.g., based on the current time of day, weather conditions, etc.). As discussed above, the vehicle's location, speed, orientation, and direction of travel may be determined from various sources, such as V2I communications, GPS or LBS data, mobile communication networks, roadside traffic cameras and on-board vehicle cameras, and the like. Vehicle location, speed, and direction data also may be predicted using driving pattern data or intended destination data received from on-board vehicle systems or other data sources.

In other examples, digital content might not be targeted for individuals within a single vehicle, but instead may be determined based on an analysis of multiple vehicles and individuals that will be in the proximity of an electronic roadside display at or near the same time. Additionally, a first selected digital content may be replaced by a different selected digital content after a first set of targeted vehicles and individuals have driven past and are no longer in view of the electronic display, and a new set of vehicles and individuals is approaching or in view of the electronic display. In these examples, the beginning and ending times for displaying specific digital content may be selected by determining the times that will maximize the potential viewing time of targeted individuals to the digital content selected for those individuals.

The digital content selected in step 204 for displaying on an electronic roadside display device may include advertisements selected based on analyses of the data received in steps 202 and/or 203. For example, targeted advertisements may be selected based on vehicle and individual characteristics retrieved from various data sources in step 202, such as demographic data, family data, financial and past purchasing data, educational data, insurance data, and the like. For example, if the vehicle and individual data retrieved in 202 indicates that the vehicles approaching a certain roadside display contain a large proportion of teenage occupants, then a targeted advertisement may be selected to appeal to that demographic. Similarly, if the retrieved data indicates that the approaching individuals include large proportions of individuals from certain economic categories, demographic characteristics (e.g., age ranges, marital statuses, children, etc.), educational or occupational characteristics, previous purchasing histories, or other characteristics, then the digital advertisements selected in step 204 may be targeted to those characteristics. Vehicle characteristics also may be used, in addition to or instead of individual characteristics, to select targeted advertisements in step 204. For instance, the make, model, and year of a vehicle may indicate likely ages, socio-economic characteristics, and hobbies and interests of the vehicle's occupants, which may be used to select targeted advertisements for roadside displays. Additional examples of the types of data that may be retrieved from various data sources, and the types of targeted advertisements or other targeted messages that may be displayed based on the retrieved data, are described below in connection with FIG. 6.

In addition to the vehicle and/or individual characteristics retrieved in step 202, vehicle and driving data retrieved from various sources in step 203, such as the driving routes and intended destinations of the vehicles also may be used to select a targeted advertisement for a roadside display in step 204. As discussed above, anticipated driving route and destination information may be received or predicted from various sources, such as vehicle navigation systems, a driver or passenger's smartphone, the driver's home and work address data (e.g., retrieved from a governmental server, insurance server, etc.), or driving patterns and previous driving trip logs stored on the vehicle or separate from the vehicle, such as on a personal mobile computing device. After analyzing this data to determine or predict a vehicle's anticipated driving route or intended destination, targeted advertisements may be selected based on the vehicle and individual characteristics as well as the anticipated driving route and intended destination. For example, if a target product (e.g., camping equipment) is selected based on the individual characteristics retrieved for the occupants of an approaching vehicle, then the anticipated driving route and destination of the vehicle may be used to select an advertisement for a camping equipment store along the anticipated driving route of the vehicle.

Certain targeted advertisements determined in step 204 also may be based on current trip driving data and/or previous trip driving data received from a vehicle on-board computing device or other system. For example, if the current trip data received from an on-board computing device (e.g., vehicle-based computer or smartphone) indicates that the vehicle is coming from a park, golf course, or other recreational activity, then a targeted advertisement may be selected for a restaurant, coffee shop, or convenience store, and the advertisement may specifically suggest post-activity food or refreshments for the occupants in the vehicle. As another example, if the current trip data received from an on-board computing device indicates that the vehicle is on a long-distance road trip, then this information may be used along with other determined individual characteristics to suggest a nearby rest stop, restaurant, or hotel.

In still other examples, vehicle and individual characteristics may be used in combination with driving behaviors and patterns to determine targeted offers to drivers. For example, an insurance provider may receive and analyze vehicle and individual characteristics (e.g., vehicle make and model, mileage, condition, driver age, driving record, etc.) for a vehicle approaching a roadside display. Along with the vehicle and individual data received from various data sources, the insurance provider also may retrieve data, such as telematics data, from an on-board computing device, a personal mobile computing device, or other database corresponding to the vehicle's driving data during the current trip and/or previous trips (e.g., safe or high-risk driving behaviors, accidents or near-accidents, instances of high-speed skidding or swerving, detections of moving violations, etc.). Based on the vehicle and individual characteristics, along with the driving data, the insurance company may determine a customized insurance offer for the driver in step 204. A customized insurance offer may, for example, identify the specific vehicle or driver by name, and include an insurance rate quote, discount, incentive, or other terms to display to the driver via the roadside display (e.g., "Hello [CUSTOMER NAME]! We at [INSURANCE COMPANY] appreciate your safe and accident-free driving. Switch today to [INSURANCE COMPANY] and you will receive a [RATE or DISCOUNT DETAILS], guaranteed!! Visit [WEBSITE] or call [AGENT NAME AND NUMBER] to redeem this offer!").

In addition to targeted advertisements, other types of digital content may be determined in step 204, including notifications, warnings, and other messages to drivers relating to vehicle maintenance, driving safety, road conditions, and the like. For example, the vehicle diagnostics, sensor data, and maintenance-related data retrieved in step 203 may be used to provide maintenance warnings and suggestions to drivers via roadside electronic displays. Thus, if a vehicle's internal sensors detect that the vehicle is low on fuel, coolant, or wiper fluid, or if the vehicle needs air in one of its tires, has a flat tire, is overdue due for an oil change, needs an alignment, or has any other maintenance issue detectable by the vehicle's sensors, then an on-board computing system may transmit this information to the content output system, so that an appropriate message, warning, or offer may be determined for the vehicle. In such examples, the digital content determined in step 204 may include an advertisement for a local gas station, tire shop, auto mechanic, or other business, including directions and relevant offers (e.g., "Almost out of gas, take Exit 217," "Oil changes, $19.99," "Free air with any fill-up," etc.).

Additional messages determined in step 204 may include customized warnings for drivers and targeted alerts relating to weather, traffic, road conditions, and other potential hazards. For example, if a vehicle-based device or personal mobile device has detected erratic driving behaviors by the driver of a vehicle, these erratic behaviors may be transmitted to the content output system and an appropriate driving alert or warning message may be determined in step 204. For instance, driving speed, curve-handling, lane position, radio usage, mobile phone usage, signal usage, time of day, trip starting point, and other driving trip data may be used to identify drivers that may be intoxicated, texting or talking while driving, beginning to fall asleep while driving, excessively speeding or racing, or engaging in other high-risk driving behaviors. If a determination is made that a driver may be driving in an impaired state or other high-risk manner, then customized content may be determined for the driver in step 204, for example, a red flashing alert warning the driver that their erratic driving has been detected, a suggestion that the driver pay greater attention, pull over to sleep, call a friend or taxi service, etc.

Other possible content determined in step 204 may include messages or alerts based on the vehicle-specific and/or driver-specific data received in steps 202 and 203, along with weather data, traffic data, road condition data, and the like. For example, a vehicle's anticipated driving route and intended destination, which may be received or determined as discussed above using on-board vehicle systems and other data sources, may be used to alert drivers to weather issues, traffic issues, or road condition issues that are specific to the driver's anticipated driving route and intended destination. For instance, an electronic roadside display may be located on Highway ABC, 1 mile before the exit for Road XYZ. As a vehicle approaches the electronic roadside display, the anticipated driving route and intended destination of the vehicle may be determined using the vehicle and individual data and/or the telematics data received in steps 202 and 203. Based on the anticipated driving route and intended destination of the vehicle, if the vehicle is likely to exit Highway ABC and travel west on Road XYZ, then the traffic, weather, and road condition alerts for westbound Road XYZ may be displayed on the electronic roadside display. Similarly, if the vehicle is likely to exit Highway ABC and travel east on Road XYZ, or is likely to continue on Highway ABC, then different sets of traffic, weather, and road condition alerts may be displayed on the electronic roadside display.

As discussed above, digital content might not be targeted for individuals within a single vehicle, but instead may be determined based on an analysis of multiple vehicles and individuals that are near an electronic roadside display at or around the same time. On a road or highway with moderate to heavy traffic, an electronic roadside display is likely to be visible to several different cars at any given time. In such cases, the determination of the digital content for the electronic roadside display in step 204 may include collecting and analyzing the various types of data concurrently for multiple different vehicles and individuals. In some cases, common characteristics among the vehicle and individual data received in steps 202 and 203 may be aggregated and compared against other characteristics to determine the digital content in step 204. As an example, a group of five vehicles may be driving near each other on the same road, and the vehicles may approach a roadside display at around the same time. If the five vehicles contain a combined total of 12 women and 4 men, then an advertisement targeted for women may be selected, instead of an advertisement targeted for men, for displaying to this group of vehicles. As another example, if a group of approaching cars contains similar numbers of men and women, but the vehicle occupants are predominately under 30 years old, then an advertisement targeted for a younger demographic may be selected in step 204. Similar aggregation techniques may be used for any of the vehicle characteristics or individual characteristics discussed above, including demographic, educational, occupational, economic, and/or personal characteristics associated with vehicles or individuals. Such aggregation techniques also may be used on the vehicle data (e.g., diagnostic or maintenance data) or the driving data (e.g., driving speeds, anticipated driving routes and destinations, etc.). For instance, if several vehicles in a group of vehicles approaching a roadside display are low on gas, or need air in their tires, then an advertisement for a nearby gas station with free air may be selected, whereas if only one of the vehicles is low on gas and needed air in its tires, then a different advertisement may be selected. As other example, if multiple vehicles in an approaching group of vehicles have approximately the same anticipated driving route, then an advertisement may be selected in step 204 for a business located on or near that driving route.

When determining digital content for a single approaching vehicle or a group of vehicles, certain characteristics may be weighted or prioritized more than other characteristics. For example, a group of vehicles approaching an electronic roadside display may consist of 75% women, and 40% soccer fans. In this example, although the percentage of women in the group of vehicles is higher than the percentage of soccer fans, an advertiser may consider the 40% of soccer fans to be a more important group characteristic with a higher effective rate of a targeted advertisement. Thus, in this example, an advertisement for an upcoming soccer exhibition match at a local stadium may be selected for display to the group of vehicles, instead of an advertisement targeted specifically to women, based on the expected financial return of the advertisement targeted to soccer fans.

As the above examples illustrate, certain advertisers may place different values on certain vehicle characteristics and individual characteristics. Additionally, some advertisers may seek opportunities to advertise to large numbers of people across multiple demographic and economic categories, while other advertisers may be more interested in advertising to small groups with specific desired sets of characteristics. Accordingly, in some embodiments, the content output system may implement a real-time auction through advertising servers and/or networks in which multiple different advertisers may compete to have their advertisements displayed on a roadside display, based on the characteristic profile of a set of vehicles approaching a roadside display. A characteristic profile may include a comprehensive listing of the characteristics of a set of individuals in a group of one or more vehicles. Thus, in step 204, a set of vehicle characteristics and individual characteristics may be compiled based on the data received in steps 202 and 203, and the compiled set of characteristics may be provided to one or more advertisers who may bid for the right to display a specific advertisement to the group of approaching vehicles. In some cases, there may be very little time between when the vehicle and individual characteristics for a group of vehicles is identified, and when those vehicles are in viewing range of an electronic display. Therefore, for some real-time auctions, the bids submitted by advertisers corresponding to different characteristic profiles for groups of approaching vehicles may be submitted in advance and stored at one or more devices within the content output system. For instance, one advertiser may pre-submit a bid indicating that they will pay a specified amount to display an advertisement to any group of vehicles including of three or more pickup truck drivers, while another advertiser may pre-submit a bid indicating that they will pay a different amount to display an advertisement to any group of vehicles including at least five parents of children under the age of ten. In this example, when a group of vehicles approaching an electronic display in the system includes three pickup truck drivers and five parents of young children, the real-time auction software application will execute to select the advertiser that bids the largest amount for their desired demographic profile. In some examples, the bids submitted by advertisers in such auctions may be per-person bids, such that the amount of the bid is determined dynamically based on the number of individuals in the approaching group that satisfy certain characteristic criteria (e.g., X dollars per pickup truck owner, Y dollars per parent, etc.).

Similarly, when the digital content determined in step 204 is something other than an advertisement, different weights and priorities still may be attached to different individual characteristics, as well as to different types of vehicle data and driving data received from on-board vehicle systems and other data sources. For example, a determination, based on driving data, that a driver may be driving while tired, distracted, or intoxicated may be prioritized over vehicle diagnostic data indicated that the some vehicle or another nearby vehicle is in need of an oil change. Thus, in this example, an alert directed to the tired, distracted, or intoxicated driver may be selected for displaying on the electronic display, instead of a suggestion for an oil change or other advertisement for another driver.

In step 205, the digital content determined in step 204 may be displayed on the appropriate electronic roadside display at the appropriate times to be viewable by the vehicles and individuals for which the data was received in steps 202 and 203. In various other examples discussed herein, the digital content determined may be displayed on various other devices (e.g., mobile devices, set-top boxes, televisions, personal computers, etc.) in addition to or instead of an electronic roadside display.

Referring to FIG. 2B, the example method of providing content to various devices may be similar to that described with respect to FIG. 2A, except that it may operate when the vehicle is not in use. For example, in step 211, one or more users of the content output system may be identified. For example, the content output system may be implemented by an insurance provider, and insurance customers, potential customers, or other individuals may register with the content output system to receive content from the system. In registering with the content output system, the user may agree to allow the system to collect various data related to the user and/or one or more vehicles associated with the user and to receive content from the system based on the collected data. Accordingly, in step 211, the content output system may identify one or more users registered with the system. The system may identify some or all users of the system. The system may use certain criteria to identify a subset of the users to whom content should be provided. For instance, users may be identified by geographical location. In this case, the content output system may only identify users residing in certain geographical areas, such as particular states in which the insurance company provides insurance policies, for example. Alternatively, or additionally, the system may identify only those users from which the system has collected a minimum amount of data. For example, the content output system may only identify users with three months' worth of collected data. As another example, the system may identify only those users from which the system has collected a certain type of data, e.g. driving scores or insurance scores. The content output system may, additionally or alternatively, use other criteria for identifying users to provide content to.

In step 212, for each of the users identified in step 211, characteristics associated with the user and or one or more vehicles associated with the user may be retrieved from one or more data sources. For example, the system may retrieve individual characteristics such as demographic data, financial data, insurance data, educational data, family data, personal data, and other types of relevant data related to the individual from various data sources. Additionally, the system may determine one or more vehicles associated with the user and retrieve vehicle characteristics for each vehicle, such as the vehicle's make and model, last recorded mileage, maintenance history, emissions history, estimated value, registered owners, and other insured drivers. The system may store identification information for the user (e.g., user name or mobile number, an email address, a license plate number, a VIN, or other identifiers) which may be used to retrieve the individual and vehicle characteristics from the various data sources. The data sources accessed and the individual and vehicle characteristics retrieved in step 212 may be similar to those described in step 202 of FIG. 2A, accordingly a detailed description of the same will be omitted herein.

In step 213, additional vehicle data and/or driving data may be received from various data sources, such as a vehicle-based computing device, a personal mobile computing device associated with the user, a telematics device, an external server, and/or various other data sources. For example, a vehicle-based computing device (e.g., vehicle computers, diagnostic systems, or telematics devices, etc.), a personal mobile computing device (e.g., a smartphone or tablet computer associated with the user), or various telematics software applications installed on a personal mobile computing device of a user or used by the user (e.g., a web-based application) may be configured to detect, store, analyze, and/or score various telematics data. The telematics software applications may include an application for family tracking, an application for monitoring mileage, a navigation application, an application to track trips, etc. For example, a family tracking application may capture location data, driving time date, driving speed data, etc.; a mileage monitoring application may capture miles driven data, etc. The telematics software applications may capture the driving data via various sensors of the personal mobile computing device, such as an accelerometer, a compass, a speedometer, a vibration sensor, gyroscope, a GPS receiver, etc. Additionally, or alternatively, the telematics software application may receive the driving data from sensors of other devices, such a plug-in device, an on-board computing device, a second mobile computing device, etc. The telematics software application may receive the driving data from other sources as well, such as from a local memory, a second computing device, a server, etc.

The telematics data may further include, for example, vehicle maintenance records, vehicle maintenance plans and schedules, vehicle diagnostics data, vehicle impacts, safety warnings, and other data generated by a vehicle's internal computer systems, driving behaviors, driving patterns, radio usage, mobile phone usage, and other relevant data, such as that described with respect to step 203 of FIG. 2A. The telematics data may further be analyzed and scored in a manner similar to that described with respect to step 203 of FIG. 2A, therefore, a detailed description of the same will be omitted herein.

In step 214, the individual and vehicle characteristics and the telematics data retrieved in steps 212 and 213 may be analyzed to select specific content to provide to the user. The selected content may include, for example, targeted visual or audio advertisements, vehicle maintenance suggestions, driving safety warnings, notifications about upcoming driving conditions, and/or other messages. In various examples, the content determined in step 214 may be selected based solely on the individual and vehicle characteristics retrieved from one or more data sources in step 212, or solely on the telematics data received in step 213, or on a combination of both types of data. The selected content may be targeted to a specific user, a specific device, a group of users, a group of devices, a specific non-user, etc. For example, the system may analyze the data retrieved from steps 212 and 213 from multiple users and may select content to be provided to a group of users having similar individual characteristics, vehicle characteristics, and/or telematics data. The content may be selected in step 214 in a manner similar to that described with respect to step 204 of FIG. 2A, therefore, a detailed description of the same will be omitted herein.

In step 215, after selecting the content to be provided in step 214, the system may determine a device for outputting the selected content. The selected content may be output on various devices such as, mobile devices, set-top boxes, televisions, personal computers, on-board display devices etc. The specific devices may be identified using VIN, mobile device ID, email address, mobile phone number, etc. The selected content may be output on devices associated with the individuals identified in step 214 to receive the selected content. The selected content may be output on devices associated with the individuals identified in step 220 described below. The selected content may be output within a telematics software application from which the data was retrieved in step 213 to provide the user with a native advertising experience. The system may determine the device for outputting the selected content in a manner similar to that described with respect to step 205 of FIG. 2A.

Referring to FIG. 2C, an example method of determining content is provided. The example method may relate to steps 204 or 214 of FIGS. 2A and 2B, respectively, and more specifically to a method of determining content in an environment in which the system implements a real-time auction through one or more advertising servers and/or networks.

For instance, as noted above, certain advertisers may place different value on certain individual characteristics, vehicle characteristics and/or telematics data associated with users. Additionally, some advertisers may seek opportunities to advertise to large numbers of people across multiple demographic and economic categories, while other advertisers may be more interested in advertising to small groups with specific desired sets of characteristics. Accordingly, in some embodiments, the system may implement a real-time auction through one or more advertising servers and/or networks, in which multiple different advertisers may compete to have their advertisements provided to one or more users, based on a characteristic profile of a set of users. The characteristic profile may include a comprehensive listing of the characteristics and driving data of a group of users.

Thus, in step 216, a set of individual characteristics, vehicle characteristics, and/or telematics data may be compiled or grouped based on the data received in steps 202 and 203 of FIG. 2A and/or steps 212 and 213 of FIG. 2B, For example, the system may compile data based on a driving score calculated from the telematics data, such as the driving score calculated in steps 203 and 213 of FIGS. 2A and 2B, respectively. As an example, if driving scores range form 1-100, the driving scores may be compiled into groups ranging from 1 to 20, 21 to 40, 41 to 60, 61 to 80, and 81 to 100. The data may be grouped in any number of different ways, such as by rank, e.g., the top 10%, top 1%, bottom 30%, etc.

Further, any of the individual and vehicle characteristics and telematics data may be compiled into groups. For example, mileage data, frequency of hard breaking, frequency of short stops, etc.

In step 217, information related to the compiled groups may be provided, via one or more advertising servers and/or networks, to advertisers who may bid for the right to provide a specific advertisement or message to the users in one or more of the compiled groups. The system may provide data to one or more advertising servers and/or networks identifying the various compiled groups without identifying the users associated with those groups. For example, the system may provide the compiled groups of driving scores to one or more advertising servers and/or networks. The advertising server/network may be a component of the content output system or may be a server external to the system. The advertising server/network may manage and coordinate the real-time bidding from one or more advertisers. The system may provide information to the advertising servers indicating the various groupings and the number of users that make up each of the groupings. For example, the system may provide information indicating that a group a driving scores ranging from 0 to 200 exists with 5,000 users, and a group of driving scores ranging from 201 to 400 exists with 7450 users, etc.

Accordingly, advertisers may seek to advertise to the users in one or more of the provided groups via one or more different devices. For example, an advertiser may wish to advertise a discount to all users having a driving score in the 601-800 range and the above 800 range. As another example, two advertisers may wish to provide an advertisement for a sale on tires to all users having a mileage in excess of 20,000 miles. Advertisers may wish to provide advertisements based on a combination of data, such as an advertisement for brake pads to users located in Chicago, who have a hard-breaking frequency in excess of 50% and have mileage in excess of 30,000 miles. Accordingly, advertisers may select groups of users to provide advertisements to, based on one or more other criteria or based on a combination of criteria. Accordingly, one or more advertiser may place a bid for the right to provide a specific advertisement to those groups of users. Thus, in step 218, the system may receive, via the advertising servers/networks, one or more bids to provide one or more advertisements or other content to the group of users meeting the determined criteria. The received bids may include data such as a bid amount, bid criteria, and advertising content, and in certain cases, the location of the content, when not stored locally in the advertising server/network. The received bids may include different or additional data, such as demographic data (e.g., zip code, age, gender, etc.), identifying information (e.g., email address, VIN, mobile device ID, mobile phone number), one or more advertisement IDs, etc. As an example, the content output system may receive, from the advertising server/network, a bid from Advertiser ABC in the amount of $12 to provide an insurance discount advertisement to the group of users with a driving score above 600.

In step 219, after receiving the one or more bids, the content output system may accept one or more bids of the received bids. Bids may be selected for acceptance based on a variety of criteria, such as the bid amount, the frequency at which the associated advertisement has been provided to a particular user, the financial yield associated with the advertisement, etc.

In step 220, the users associated with the criteria specified in the accepted bids may be determined. For example, using the example provided above in which a bid is received from Advertiser ABC in the amount of $12 to provide an insurance discount advertisement to the group of users with a driving score above 600, the group of users having a driving score above 600 will be determined.

In step 222, the content associated with the accepted bids is received. For example, the content may be transmitted from the advertising servers/networks or may be retrieved using the location information specified in the accepted bids.

Referring now to FIGS. 3A-3E, five diagrams are shown illustrating various different components and configurations in certain examples of content output systems. Each of the computing devices and systems shown in FIGS. 3A-3E may include some or all of hardware, software, and networking components described in the illustrative computing device 101 of FIG. 1.

Additionally, each of the computing devices and systems illustrated in FIGS. 3A-3D may perform, individually or in combination with other system components, the method steps discussed in connection FIG. 2A, and in other examples and embodiments described herein. Additionally, although each of the examples in FIGS. 3A-3D shows that digital content may be displayed on an electronic roadside display, it should be understood that in other examples, digital or other content, such as audio content, may be determined similarly and output on other types of devices, such as vehicle-based devices, personal mobile devices, televisions, home computing devices, radios, and the like, as discussed below in FIGS. 4-7.

Additionally, each of the computing devices and systems illustrated in FIG. 3E may perform, individually or in combination with other system components, the method steps discussed in connection FIG. 2B, and in other examples and embodiments described herein. Additionally, although the example in FIG. 3E shows that content may be output to a portable computing device, it should be understood that in other examples, the content may be determined similarly and output on other types of devices, such as vehicle-based devices, televisions, home computing devices, radios, and the like, as discussed below in FIGS. 4-7.

Figure 3A:
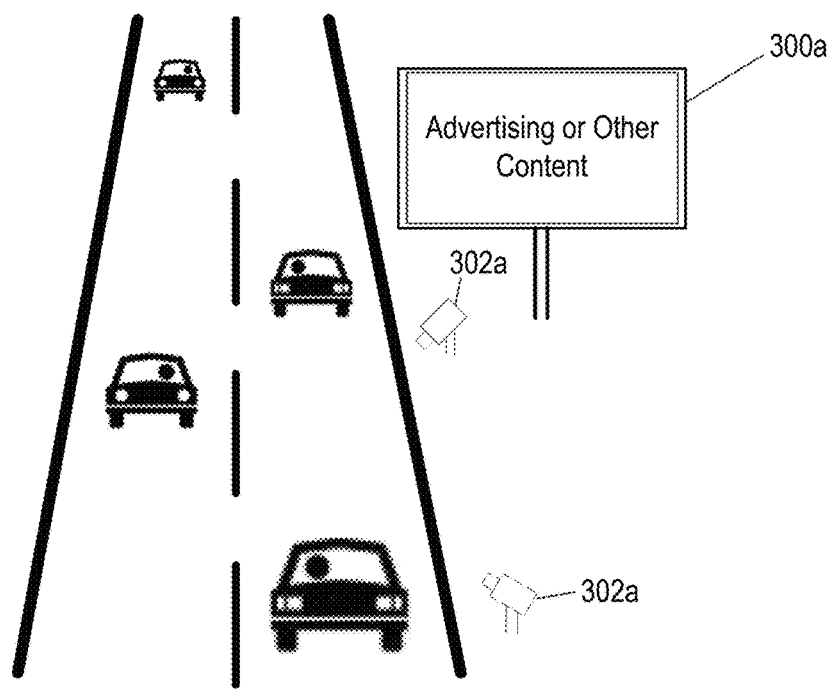
FIGS. 3A-3E are diagrams illustrating various combinations of components and configurations in certain examples of content output systems, according to one or more aspects of the disclosure.

In FIG. 3A, a diagram is shown of an example content output system including an electronic display 300a, and one or more roadside or traffic cameras 302a. In this example, a control unit (e.g., including processor, memory, network interface, etc.) located at or near the electronic display 300a may receive image and video data from traffic cameras 302a. The image and video data may be used to detect vehicles approaching an electronic display 300a, and identify various features and characteristics of the approaching vehicles and the occupants within the vehicles. For instance, image analysis software at the traffic cameras 302a or electronic display 300a may be used to identify the number of passengers, estimate the ages and genders of passengers, identify other visible passenger characteristics, identify the license plate by state and number, identify bumper stickers on the vehicle, post-factory vehicle modifications, and vehicle accessories such as ski or bike racks and luggage racks.

Instead of using traffic cameras 302a, or in combination with the traffic cameras, certain systems similar to those in FIG. 3A may include additional roadside sensors such as traffic counters, proximity sensors, and/or wireless transceivers (e.g., Bluetooth, Wi-Fi, and radio transceivers) that may be used to detect vehicles approaching the electronic display 300a and determine various vehicle and individual characteristics.

In addition to any vehicle and individual characteristics determined based on the image and video data from cameras 302a and other sensors, the system in FIG. 3A may include a local database to store and track additional characteristics and driving data. For example, a local data storage at the electronic display 300a may store data for passing vehicles, such as vehicle identifying information (e.g., license plate state and number), the time and the date the vehicle passed the electronic display 300a, the vehicle's speed, acceleration, steering, and lane positioning, the number of passengers in the vehicle, etc. Each time a vehicle is detected approaching the electronic display 300a, the vehicle's identifying information may be identified and used to retrieve data from the local data storage relating to the vehicle's previous trips. The vehicle and driving data from the current trip may be compared to the vehicle's previous driving trips to determine additional information, for example, if the vehicle is speeding or driving erratically compared to its past trips, if the vehicle is driving the route at an unusual time or day compared to its past trips, if a different driver or different passengers are in the vehicle compared to its past trips, if the vehicle has new body damage since its past trip, etc.

After identifying one or more approaching vehicles, determining vehicle characteristics, individual characteristics, driving data, etc., as described above, a control unit at the electronic display 300a may determine digital content to display to the approaching vehicles on the electronic display 300a. As discussed above in step 204, the digital content may correspond to a targeted advertisement or other message based on the identified vehicle characteristics, individual characteristics, driving data, and the like, of the approaching cars.

Thus, in the example content output system shown in FIG. 3A, the electronic display device 300a and/or other roadside devices may include processing units, memory units, and various other hardware and software components. Thus, the various steps discussed above in FIG. 2A, such as identifying approaching vehicles, determining vehicle characteristics, individual characteristics, driving data, and the like, and determining and displaying digital content based on the characteristics of the approaching vehicles, along with the other examples and embodiments discussed herein, may be performed by an electronic display device 300a. In such systems, the electronic display 300a or other roadside devices may perform all functions of the system, without coordinating or communicating with any other devices, such as on-board vehicle devices or any other external servers.

Figure 3B:
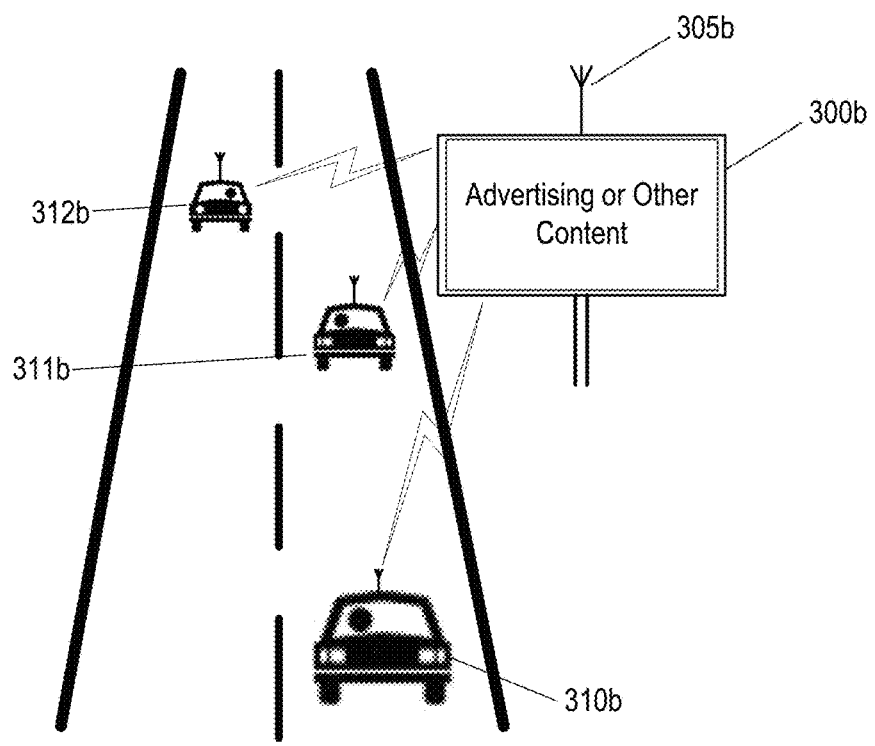

Referring now to FIG. 3B, a diagram is shown of another example content output system including an electronic display 300b, and one or more on-board vehicle computing devices 310b-312b. In this example, the on-board vehicle computing devices 310b-312b may include vehicle-based systems (e.g., vehicle computers, navigation systems, telematics devices, etc.) or personal mobile devices of the vehicles' occupants (e.g., smartphones, tablet computers, etc.). These devices may be configured (e.g., via mobile software applications) to establish wireless communication sessions with electronic displays 300b positioned along roads and highways, which may be configured with antenna 305b to receive transmissions from nearby vehicles 310b-312b. Depending on the types of the on-board vehicle computing devices 310b-312b, various different protocols and techniques may be used for the wireless communication sessions, including V2V and V2I communications, Wi-Fi, Bluetooth, and various other mobile communications networks.

The example system shown in FIG. 3B may perform similar functions to those discussed above for the system FIG. 3A, in that both example systems may be configured to identify approaching vehicles, determine vehicle characteristics, individual characteristics, driving data, and the like, and determine and display digital content based on the characteristics of the approaching vehicles. However, in some cases, the on-board vehicle devices 310b-312b used in FIG. 3B may be configured to identify and transmit additional information that cannot be determined by the cameras 310a or other roadside sensors, such as the identities of the vehicle driver and passengers, specific driving data, anticipated destinations, driving patterns, and the like. On-board vehicle devices 310b-312b also may be configured to transmit data further in advance than data can be detected by traffic cameras 310a. This additional data from on-board vehicle devices 310b-312b, and the earlier availability of data from multiple vehicles, may allow the system of FIG. 3B to perform more detailed and robust determinations of the digital content for the electronic display 300b using the techniques discussed above in step 204.

In some cases, location, speed, and direction data from the on-board vehicle devices 310b-312b may be used to determine when the content on the electronic display 300b will be visible to the occupants of the different vehicles, allowing for more precise calculations for the beginning and ending times for displaying certain digital content. Additionally, the location, speed, and direction data may be used to identify vehicles that are traveling in the opposite direction (e.g., vehicle 312b), or traveling on a different nearby road (e.g., a highway frontage road) so that the electronic display 300b will not be visible to those vehicles, and data from those vehicles may be excluded from the selection of digital content.

In the example content output system shown in FIG. 3B, the electronic display 300b and/or on-board vehicle devices 310b-312b may include processing units, memory units, and various other hardware and software components configured to perform the functionality of the system.

For example, any of the individual devices in FIG. 3B, or a combination these devices, may perform the steps discussed above in FIG. 2A, including identifying approaching vehicles, determining vehicle characteristics, individual characteristics, driving data, and the like, and determining and displaying digital content based on the characteristics of the approaching vehicles. Thus, the electronic display 300b and/or on-board vehicle systems 310b-312b may perform all functions of the system without coordinating or communicating with any other devices, such as other external servers or data sources. In some cases, the analyses of vehicle characteristics, individual characteristics, driving data, etc., and the determination of the digital content to display on the electronic display 300b, may be performed entirely by an individual on-board vehicle device 310b, after which the determined content may be transmitted to the electronic display 300b.

Figure 3C:
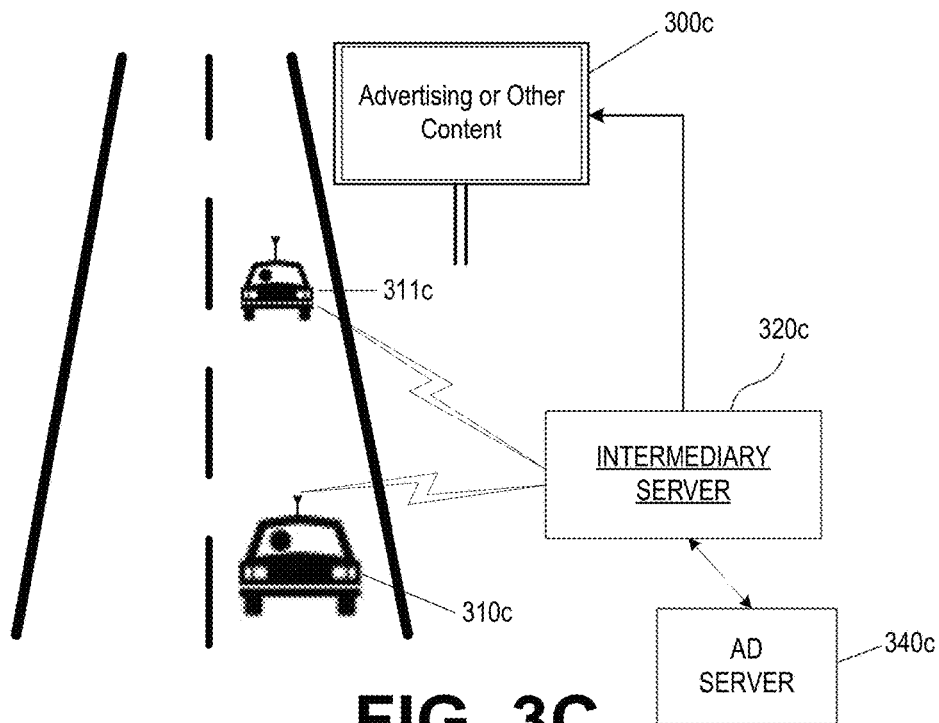

Referring now to FIG. 3C, a diagram is shown of another example content output system including an electronic display 300c, an intermediary server 320c, and one or more on-board vehicle computing devices 310c-311c. In this example, the on-board vehicle computing devices 310c and 311c (e.g., vehicle-based systems or personal mobile devices) may wirelessly transmit vehicle identifier information (e.g., a license plate number, VIN, user name or mobile number, or other identifiers) to the intermediary server 320c, along with the vehicle's position, speed, and/or direction data. Depending on the types of the on-board vehicle computing devices 310c and 311c, various different protocols and techniques may be used for the wireless communication to the intermediary server 320c, including V2V and V2I communications, Wi-Fi, Bluetooth, and various other mobile communications networks. The intermediary server 320c may receive such transmissions from a plurality of vehicles, and may use the vehicle identifier information and location data to track the vehicles and to determine beginning and ending times for when vehicles 310c and 311c will be in viewing range of an electronic display 300c.

The intermediary server 320c may also receive various types of data (e.g., vehicle characteristics, individual characteristics, driving data, etc.) from the on-board vehicle devices 310c-311c, as described above in FIG. 2A. The intermediary server 320c may be a telematics server and may analyze and process the telematics data, such as by calculating a driving score based on the telematics data. In some cases, the intermediary server 320c also may use the vehicle identifier information to retrieve additional data from other data sources, such as a local data storage or remote data sources (e.g., data sources 330d). In some examples, the intermediary server also may receive instructions from one or more other devices, such as advertising servers 340c. As discussed below in more detail, an advertising servers 340c may receive a characteristic profile of one or more approaching vehicles or individuals, and may instruct the intermediary server 320c (or may directly instruct the roadside display 300c) to display a particular advertisement or message. For instance, multiple advertising servers 340c may be connected to intermediary server 320c and/or roadside display 300c, and may perform real-time bidding based on the approaching vehicles and individuals. In certain embodiments, the intermediary servers may themselves be advertising servers 340c, or may be integrated with advertising servers 340c. Similar implementations and processes for intermediary servers and advertising servers may be used even when the digital advertisements or messages are not displayed on roadside displays, but instead on other types of digital displays (e.g., addressable computers and televisions, on-board vehicle devices, smartphones and other personal mobile devices, etc.), discussed below in FIGS. 3E and 4.

After receiving the various vehicle and individual data from the on-board vehicle devices 310c-311c and/or other data sources, the intermediary server 320c may analyze the data and determine digital content for the electronic display 300c. Thus, in some examples, the intermediary server 320c in FIG. 3C may individually perform all of the steps discussed above in FIG. 2A, by receiving data from on-board vehicle devices 310c-311c and determining digital content to transmit to electronic display 300c. In other examples, the intermediary server 320c may perform the various steps in combination with the on-board vehicle devices 310c-311c and/or one or more additional devices.

In some cases, an intermediary server 320c need not be tied to one specific electronic roadside display, but may be configured to receive data from many different on-board vehicle devices 310c, and determine digital content for many different electronic displays 300c. Additionally, for an intermediary server 320c connected to multiple different electronic displays 300c, the intermediary server 320c may be capable of using the different electronic displays 300c in sequence to present certain users with multi-part targeted advertisements or other messages. For instance, intermediary server 320c may place a first portion of a multi-part advertisement on a first electronic display 300c as a targeted vehicle is driving past the first display. Later in the driving trip, when the vehicle approaches a second electronic display 300c, also controlled by the intermediary server 320c, the intermediary server 320c may detect the approach of the vehicle and select the next portion of the multi-part advertisement to display via the second electronic display 300c. Using similar techniques, an intermediary server 320c may implement interactive targeted advertisements and messages, described in more detail below in FIG. 7.

Figure 3D:
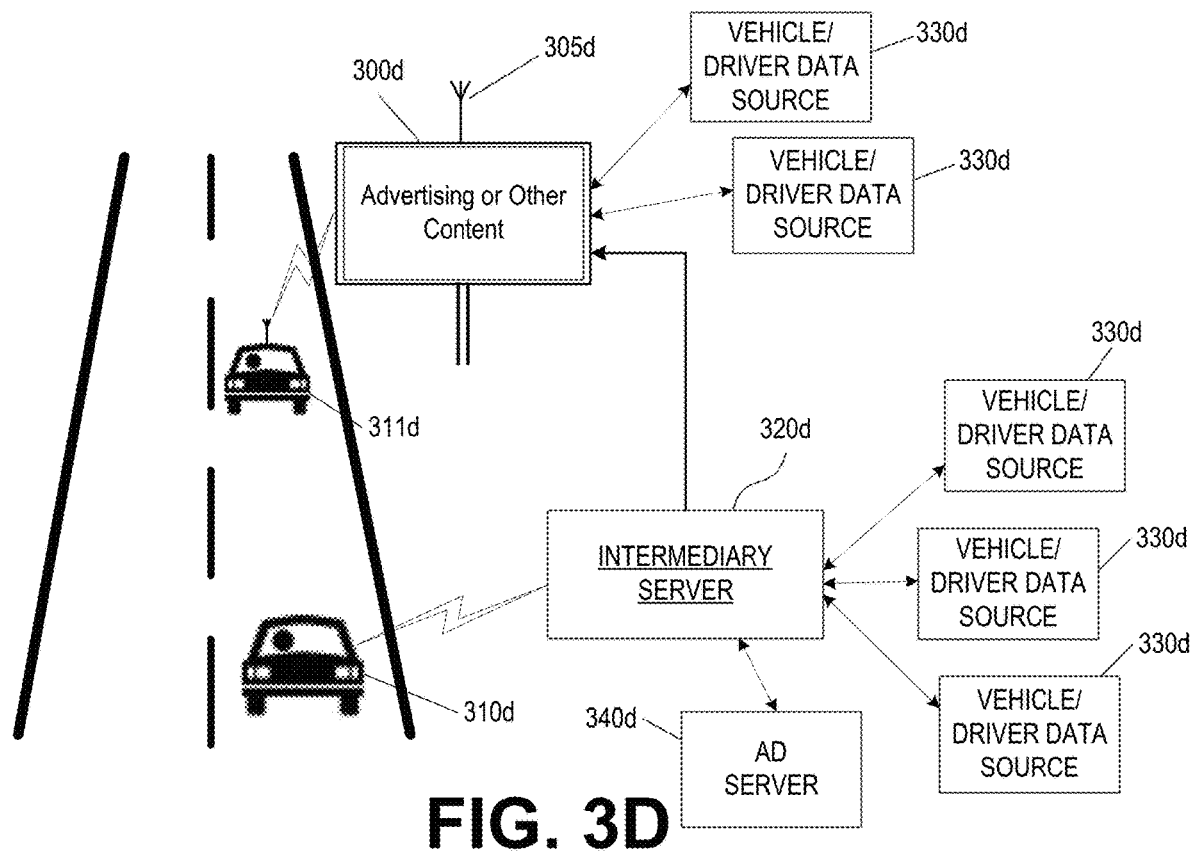
Figure 3E:
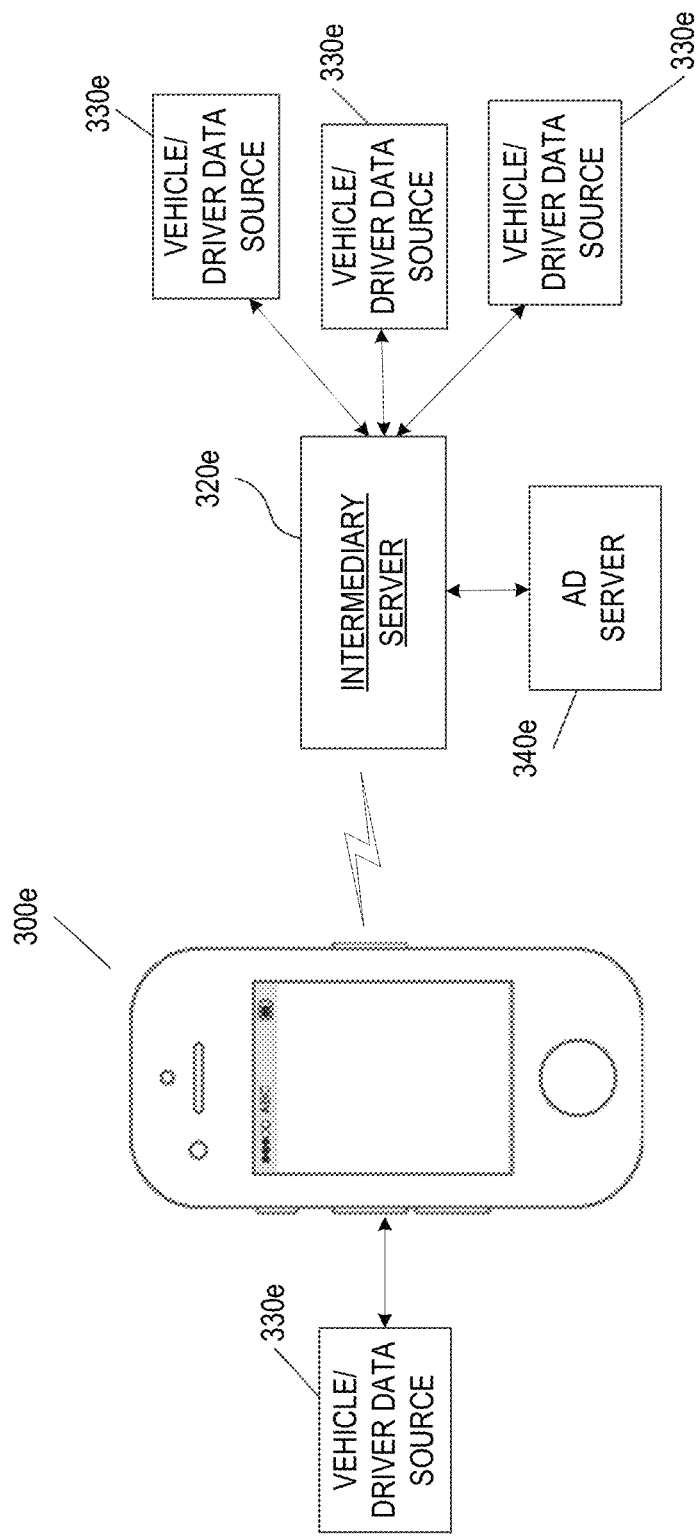

Referring now to FIG. 3D, a diagram is shown of another example content output system including an electronic display 300d, an intermediary server 320d, an advertising server 340d, one or more on-board vehicle computing devices 310d-311d, and a plurality of data sources 330d. As discussed above in FIG. 3B, the electronic display 300d in this example may be configured with an antenna 305d to receive wireless transmissions from nearby vehicles 311d. Such transmissions may be sent by the on-board vehicle devices (e.g., vehicle-based computers, telematics devices, navigation systems, smartphones, etc.) using various different protocols and techniques, such as V2V and V2I communications, Wi-Fi, Bluetooth, and various other mobile communications networks. In this example, other on-board vehicle devices 310d may be configured to transmit data to an intermediary server 320d (e.g., via a mobile application of a smartphone or vehicle-based device), rather than transmitting data to the electronic display 300d. The intermediary server 320d may perform similar functions to those of intermediary server 320c in FIG. 3C. Thus, in this example, the determination of the digital content to display on the electronic display 300d may be performed at the electronic display 300d, the intermediary server 320d, or a combination of these devices and/or other system (e.g., on-board vehicle devices 310d-311d).

As shown in FIG. 3D, both electronic displays 300d positioned along roadsides, and intermediary servers 320d elsewhere, may communicate with various data sources to receive vehicle and individual characteristics, driving data and patterns, etc. For example, in some cases an on-board vehicle system 310d or 311d may be configured to transmit vehicle or user identification information (e.g., license plate number, VIN, registration number, insurance policy number, name and license number of vehicle owner, owner insurance account number, name and license number of driver, driver insurance account number, etc.), but might not transmit much (if any) additional vehicle characteristics, individual characteristics, driving data, etc. In such cases, an electronic display 300d or intermediary server 320d may receive the vehicle and user identification information, and use this information to receive vehicle and individual characteristics, driving data, driving patterns, and various other types of data from data sources 330d. The data retrieved from data sources 330d may include demographic data, financial data, insurance data, educational data, family data, personal data, driving data, etc. Examples of data sources and types of data that may be retrieved from data sources are described below in reference to FIG. 6.

Referring now to FIG. 3E, a diagram is shown of another example content output system. FIG. 3E may be similar to FIGS. 3C-3D, except that instead of using an electronic roadside display to display the content, the content may be output on a portable computing device. Accordingly, the example content output system of FIG. 3E includes a portable computing device 300e, an intermediary server 320e, an advertising server 340e, and a plurality of data sources 330e. The example system may be configured to identify users of the system, determine vehicle characteristics, individual characteristics, and/or driving data, analyze the characteristics and the driving data, and select and output content based on the determined characteristics and the driving data as discussed above in FIG. 2B. The selected content may be output on a determined device, such as the portable computing device 300e. Alternatively or additionally, the selected content may be output on other devices, such as addressable computers and televisions, on-board vehicle devices, personal computers, radios, etc.

In the example content output system, the portable computing device 300e may include processing units, memory units, and various other hardware and software components configured to perform the functionality of the system. For example, the portable computing device 300e may perform all of the steps discussed above in FIG. 2B. Thus, the portable computing device 300e may perform all functions of the system without coordinating or communicating with any other devices, such as other external servers or data sources. Alternatively, the portable computing device 300e may wirelessly communicate with the intermediary server 320e. In this case, the portable computing device 300e may wirelessly transmit some or all of the vehicle characteristics, individual characteristics, and telematics/driving data to the intermediary server 320c. For example, the portable computing device 300e may transmit vehicle or user identifier information (e.g., a license plate number, VIN, user name or mobile number, or other identifiers) for a user or for a vehicle associated with the user, and the intermediary server 320e may use the vehicle identifier information to retrieve additional vehicle and individual characteristics and/or telematics data from other data sources 330e, such as a local data storage or remote data sources. Alternatively, the portable computing device 300e may store the vehicle and individual characteristic data and/or the telematics data, or may retrieve such data itself from a remote source, and may transmit such data to the intermediary server 320e. The intermediary server 320e may be a telematics server and may analyze and process the received telematics data, such as by calculating a driving score based on the telematics data. The intermediary server 320e may receive such transmissions from a plurality of users. Various different protocols and techniques may be used for the wireless communication to the intermediary server 320e, including, Wi-Fi, Bluetooth, and various other mobile communications networks.

After receiving the various characteristic profile and driving data, the intermediary server 320e may analyze the data and determine content to be output. In some examples, the intermediary server 320e also may receive instructions from one or more other devices, such as advertising server 340e. The advertising server 340e may receive a characteristic profile and/or driving data of one or more users and may instruct the intermediary server 320e (or may directly instruct the portable computing device 300e) to select content for output. For instance, multiple advertising servers 340e may be connected to intermediary server 320e and may perform real-time bidding based on the identified users and the associated characteristic profile and/or driving data. In certain embodiments, the intermediary servers 320e may themselves be advertising servers 340e, or may be integrated with advertising servers 340e.

After selecting the content, the intermediary server 320e may determine and control a device to output the selected content. For example, the intermediary server 320e may determine and control the portable computing device 300e to output the selected content.

Thus, in some examples, the intermediary server 320e may individually perform all of the steps discussed above in FIG. 2B, or may perform the various steps in combination with the portable computing device 300e and/or one or more additional devices.

Figure 4:
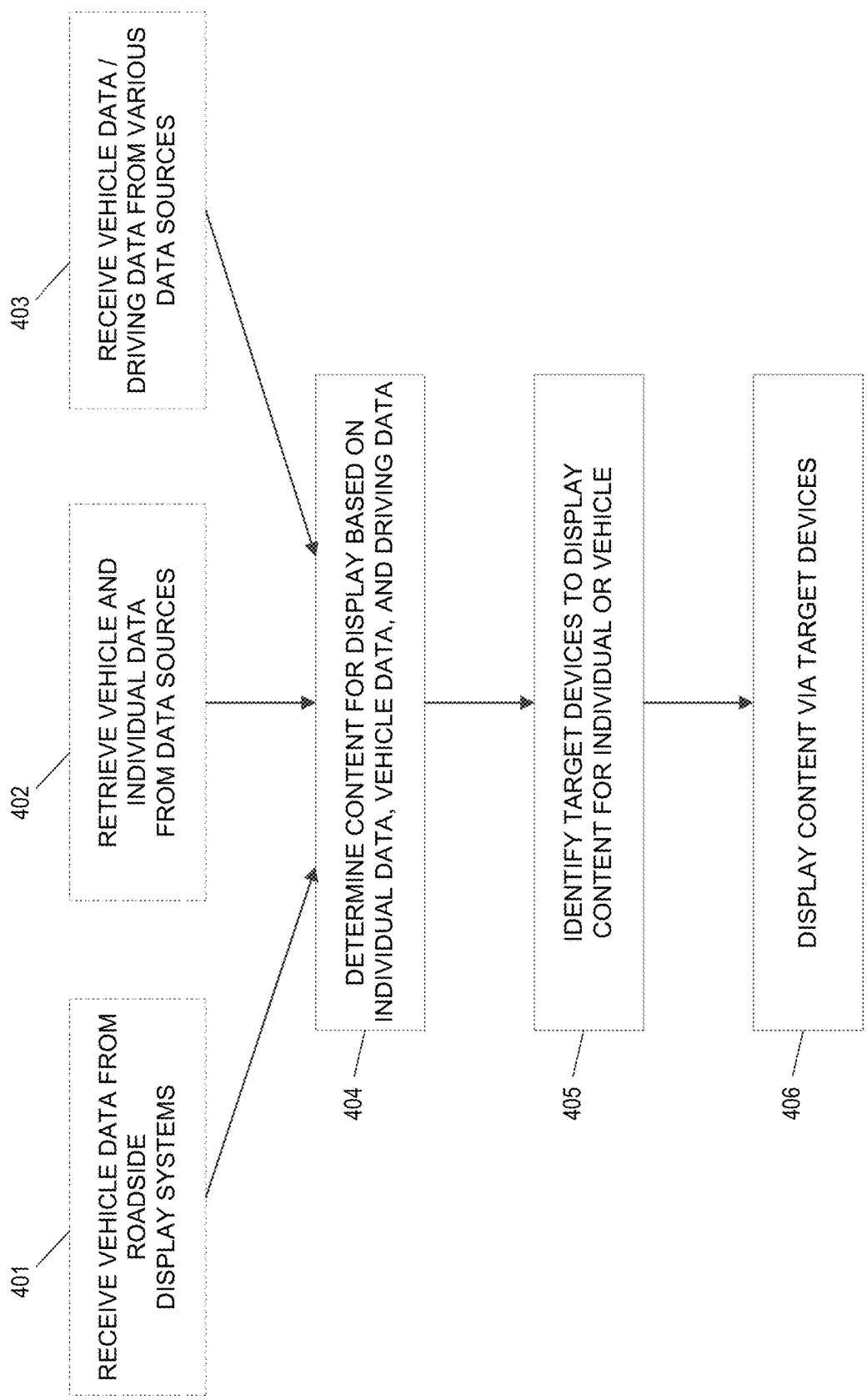
FIG. 4 is a flow diagram illustrating an example method of displaying digital content via content outputs based on vehicle and individual characteristics and/or driving data, according to one or more aspects of the disclosure.

FIG. 4 is a flow diagram illustrating an example method of providing content via electronic displays, based on vehicle and individual characteristics and/or driving data. The various embodiments and examples described in connection with FIG. 4 may be implemented using a number of computing systems, operating individually or in combination, such as various electronic displays, mobile devices, on-board vehicle systems, intermediary servers and other computing devices. Each of computing devices and systems in these examples may include some or all of hardware, software, and networking components as the illustrative computing device 101 described in FIG. 1.

Like the examples discussed above regarding FIGS. 2A-2B, FIG. 4 relates to determining content that may be displayed to specific vehicles and/or individuals, based on vehicle data, individual data, driving data, and the like. The examples described below in FIG. 4 describe receiving data from various sources and may involve one or more types of display devices (e.g., roadside display devices, home computers, television receivers and set-top boxes, personal mobile devices, vehicle-based display devices), and may be performed before, during, or after a driving trip. For example, a targeted advertisement, vehicle maintenance message, driving safety message, or other digital content may be determined and displayed via a roadside display, vehicle-based display, smartphone or other personal mobile device, home computer, television, or any other digital display. The examples provided with respect to FIG. 4 describe the selection of a display device type (e.g., roadside display, vehicle-based display, personal mobile device, home computer, television, etc.) the timing for displaying the digital content (e.g., before, during, or after a driving trip), the mechanisms for receiving user feedback in response to the displayed digital content, etc.

In steps 401-403, data relating to one or more vehicles and/or individuals may be received from various sources, including roadside display devices (step 401), data sources (step 402), and vehicle on-board systems and/or portable computing devices (step 403). In steps 404-406, the data received in steps 401-403 may be analyzed to determine digital content to display (step 404), determine target devices on which to display the digital content (step 405), and then display the digital content on the target devices (step 406). As indicated in FIG. 4, each of steps 401-403 may be optional. Thus, in various different examples, digital content may be determined in step 404 based only data received from roadside display devices (step 401), based only on data received from data sources (step 402), based only on data received from vehicle on-board systems and/or portable computing devices (step 403), or based on any combination of data received in steps 401-403.

In step 401, data may be received from one or more electronic roadside display devices relating to vehicles or individuals near the electronic roadside displays (e.g., 300a-300d). The data received in step 401 may be similar or identical to the data received in step 201 of FIG. 2A, discussed above. For example, a computing device or system positioned along a roadside may use cameras, motion sensors and proximity sensors to detect the approach of a vehicle and retrieve identifying information for the vehicle and/or passengers. For instance, a roadside motion detector and camera system located near an electronic roadside display may detect approaching vehicles and receive vehicle-specific identification information, such as the vehicle's license plate number and state, VIN, registration tag, etc. In addition to identifying a vehicle and/or individuals in a vehicle, roadside display devices may determine the current locations, speeds, directions of travel, roads and routes being driven, etc. As discussed above in step 201, electronic roadside display devices also may receive data from nearby vehicle-based systems and mobile computing devices of vehicle drivers or passengers. The data may relate to the vehicle, the vehicle's occupants, the vehicle's driving data, etc.

After collecting various vehicle information, individual information, and/or driving data in step 401, the electronic display device may transmit this data, for example, to an intermediary server, advertising servers and/or networks, home computing device, personal mobile device, content determination and display server, or vehicle-based device. The electronic display device may also transmit time and location data in step 401, to allow the receiving devices to determine when and where certain vehicles and individuals were detected by the roadside display device.

In step 402, vehicle data, individual data, and/or driving data may be received from one or more data sources. Several examples of data sources, and the types of data that may be retrieved from the example data sources, are described below in connection with FIG. 6. The data received in step 402 may be similar or identical to the data received in step 202 of FIG. 2A and step 212 of FIG. 2B, discussed above. Accordingly, the data retrieved from data sources in step 402 may correspond to the detection of a vehicle or individual approaching a roadside display, as in step 202. Alternatively or additionally, the data retrieved from the one or more data sources in step 402 may correspond to the identification of a user registered with the content output system, as in step 212. For example, the one or more data sources may be accessed in step 402 to retrieve demographic data, financial data, insurance data, educational data, family data, personal data, telematics data, and other types of relevant data relating to vehicles and/or individuals associated with vehicles (e.g., drivers, owners, etc.), regardless of whether those vehicles are currently being driven. The data sources may be accessed in various examples by intermediary servers, advertising servers and/or networks, home computing devices, personal mobile devices, or vehicle-based devices, content determination and display servers, etc., to retrieve vehicle information, individual information, and/or driving data in step 402.

In step 403, vehicle data, individual data, and/or driving data may be received from one or more data sources, such as, vehicle-based devices (vehicle computers, telematics devices, navigation devices, plug-in devices, aftermarket devices, etc.), portable computing devices, such as mobile phones or other personal mobile devices, external servers, etc. The data received in step 403 may be similar or identical to the data received in step 203 of FIG. 2A and step 213 of FIG. 2B, discussed above. Accordingly, the data retrieved from vehicle-based devices and/or mobile computing devices in step 403 may correspond to vehicles or individuals currently driving or approaching roadside displays, as in step 203. Alternatively or additionally, the vehicle data, individual data, and/or driving data received in step 403 may be transmitted at times and places not corresponding to driving trips, as in step 213. For example, vehicle and driving data may be transmitted in step 403 before or after driving trips, according to a predetermined schedule (e.g., hourly, daily, weekly, etc.) or when a vehicle-based or mobile device returns home and syncs with a master device, etc.

In step 404, one or more computing devices in the content output system may determine digital content to display to the vehicles and/or individuals based on the data received in steps 401-403. Step 404 may be performed by, for example, an intermediary server, content determination and display server, advertising servers and/or networks, home computing device, personal mobile device, home television system (e.g., set-top box or television content provider), or the like. The determination of digital content for specific vehicles and/or individuals in step 404 may be similar or identical to the determination of digital content in step 204 of FIG. 2A and step 214 of FIG. 2B, discussed above. For example, a targeted advertisement, vehicle maintenance warning, driving safety message, or other digital content may be selected for one or more vehicles and/or individuals based on the analysis of the data received in steps 401-403. Accordingly, in step 404, the determined digital content may be selected for display via a roadside display device, as in step 204, or, alternatively or additionally, may be selected for display via one or more personal mobile devices (e.g., smartphones or tablet computers), vehicle-based devices, home computers or televisions, etc., as in step 214. Additionally, the digital content may be selected for presenting to a user before, during, and/or after driving trips.

In step 405, the content output system may identify one or more target devices on which to display the digital content determined for the vehicle and/or individual in step 404. For example, after analyzing the various data received in steps 401-403, and determining the digital content in step 404, an intermediary server, advertising servers and/or networks, or other computing device may retrieve a previously stored list of display devices associated with the vehicle(s) and/or individual(s) and select one or more of the display devices on which to display the content. In some cases, a roadside display or an on-board vehicle device (e.g., vehicle-based display or personal mobile device) may be selected in step 404. In other cases, another computing device or online account may be selected in step 404. For example, an individual's physical address and/or television broadcast account information may be retrieved (e.g., from a vehicle registration database or other data source 300*b*) and used to insert a customized television commercial into the individual's television broadcast stream. In other examples, an individual's email address may be retrieved (e.g., from the individual's mobile device or a data source 300*d*) and used to transmit an email including the determined content to the user's home computer, work computer, or mobile device, etc. In still other examples, various user account information (e.g., financial accounts, insurance accounts, social networking accounts, etc.) may be retrieved from different data sources 330*d* to allow the determined content to be presented as online advertising/content during a subsequent login by the user to the corresponding websites (e.g., financial institution websites, insurance websites, social networking websites, etc.).

In addition to the determination of the target device(s), step 405 may include the determination of target times at which the determined digital content should be presented on the target devices. For example, if determined digital content for a user is to be displayed via the user's vehicle dashboard display, then the target time for the content may be during a current driving trip, or the next driving trip taken by the user, etc. If the determined digital content is a customized television commercial for a user, then the target time for presenting the commercial may be during a time when the user is likely (or certain) to be watching television. On the other hand, if the determined digital content for a user is to be transmitted to the user's personal mobile device (e.g., via SMS or MMS or via an application, such as a telematics software application, installed on the personal mobile device), automated telephone message, email, etc., then the content may be sent anytime.

Although the determination of the digital content in step 404 and the determination of the target devices (and target times) in step 405 are shown as different steps in FIG. 4, it should be understood that these steps may be combined in some implementations. For example, certain content may be better suited to certain display types, display sizes, display characteristics, and interactive features of display devices. An advertiser may desire certain targeted advertisements to be display on larger displays (e.g., televisions) and/or displays with certain characteristics or capabilities (e.g., high-definition displays, 3-D displays, etc.), while other targeted advertisements may be suitable for smaller and/or text-only displays such as some vehicle-based devices or mobile phones. Other targeted advertisements may be designed for display on interactive display devices (e.g., home computers, laptops, smartphones, etc.) that may allow the user to respond and make an immediate purchase, etc. Still other targeted advertisements or other non-advertising content (e.g., vehicle maintenance or driving safety warnings, traffic or weather alerts, etc.) may be time sensitive, and thus the selection of the target devices in step 405 may be based on the current location and/or the nearest display screens to the targeted users or vehicles.

In step 406, the digital content determined in step 404 may be displayed on the target devices (at the target times) determined in step 405. Thus, step 406 may be similar or identical to step 205 of FIG. 2A and step 215 of FIG. 2B. Accordingly, as discussed above, the target devices determined in step 405 may be electronic roadside displays as described in step 205. Alternatively or additionally, in step 406, the digital content may be displayed on one or more various computing devices (e.g., vehicle-based displays, smartphones or tablet computer displays, televisions, home computers, etc.), and may be displayed at different suitable times (e.g., before, during, or after driving trips) as described in step 215.

Figure 5A:
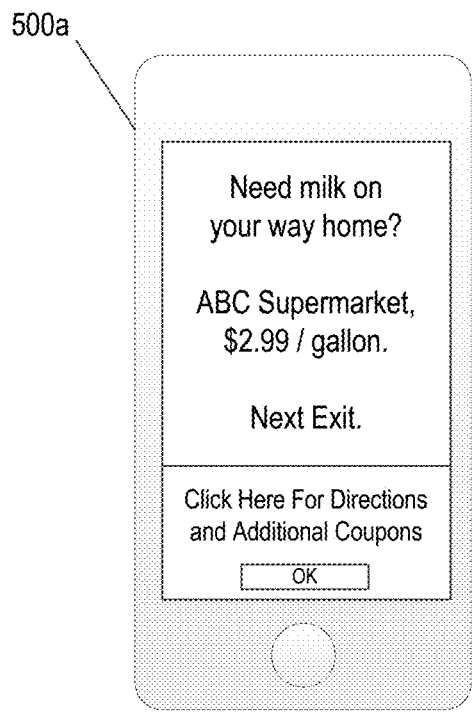
FIGS. 5A-5C are diagrams illustrating examples of content outputs of content based on vehicle and individual characteristics and/or driving data, according to one or more aspects of the disclosure.
Figure 5B:
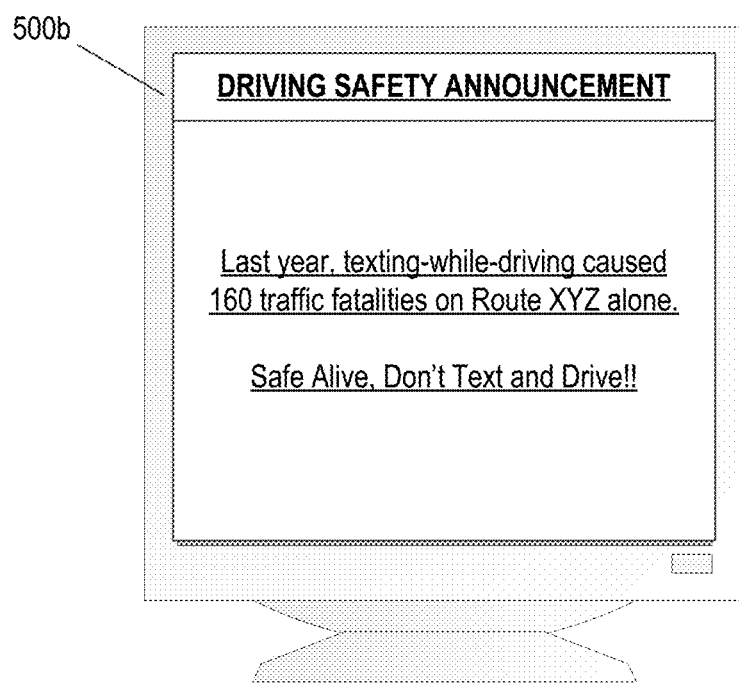
Figure 5C:
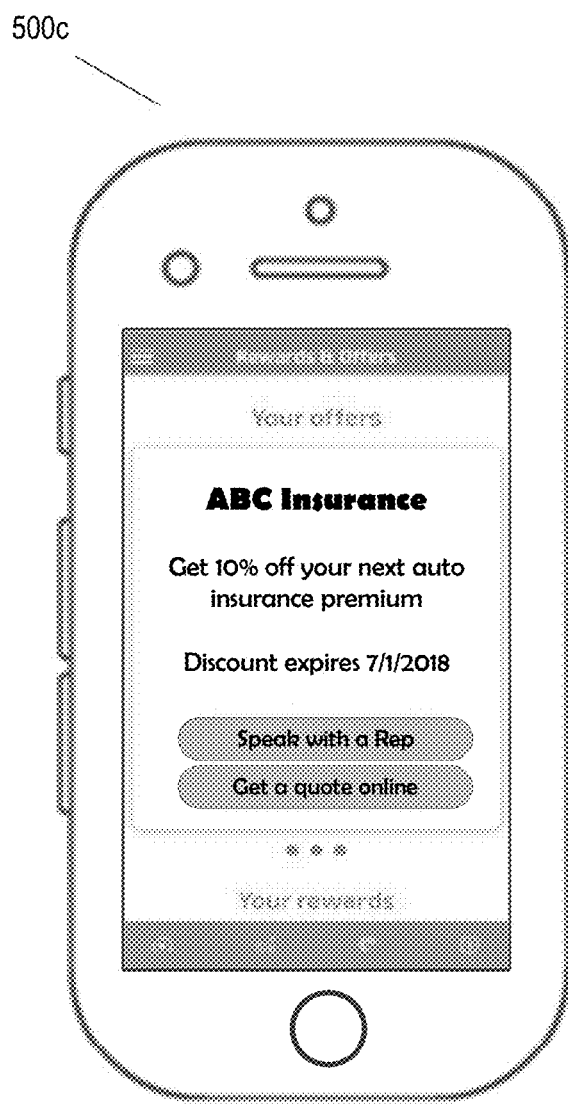

Referring now to FIGS. 5A-5C, example electronic displays are shown displaying content based on specific vehicle characteristics, specific individual characteristics, and/or specific driving data. The content displayed in these examples, and the display devices 500a, 500b, and 500c on which the content is displayed, may be determined using the various techniques discussed above in FIG. 4.

For example, FIG. 5A shows a targeted advertisement for a supermarket displayed on a mobile device 500a. In this example, the targeted advertisement has been transmitted to the mobile device 500a and may be displayed to the user, either just before a driving trip or during a driving trip. Mobile device 500a may be, for example, the smartphone of a driver or passenger in a vehicle. The advertising content, in this case, an advertisement/coupon for milk at ABC Supermarket, was determined as described above in steps 401-404. For example, an advertising server and/or network, intermediary server, or the smartphone 500a itself, may have received and analyzed various vehicle data, individual data relating to the driver or passengers, and/or driving data, before selecting the ABC Supermarket advertisement as the content and the smartphone 500a as the target device. The data received and analyzed in this case may include, for instance, the current location of the smartphone 500a (e.g., in a moving vehicle at a current driving location), the intended destination or anticipated driving route of the vehicle carrying the smartphone, the purchasing history and preferences of the smartphone owner and/or vehicle occupants, the current time (e.g., to determine if the store is open), the average speed and other driving data for the current driving trip (e.g., to determine if the driver is in a hurry), and various other data received from roadside display devices (in step 401), vehicle/individual data sources (in step 402), and/or on-board vehicle devices and/or portable computing device (in step 403).

FIG. 5B shows a driving safety announcement on a non-mobile display device 500b, for example, a desktop computer monitor or television. Thus, unlike the example of FIG. 5A, the determined content in FIG. 5B might not be shown during a driving trip or on a mobile device. Instead, the driving safety announcement in FIG. 5B may be shown to a targeted user, via television screen 500b, monitor 500b, or other display 500b, during non-driving times such as before or after driving trips. In this case, the driving safety announcement is a warning about the dangers of texting while driving. However, the particular safety announcement displayed in FIG. 5B may be customized in multiple ways for one or more specific individuals. For instance, the data received from various sources in steps 401-403 may be analyzed to determine that a user recently drove home from work along Route XYZ, and sent three text messages during the driving trip. This data may be retrieved from the various data sources described above in steps 401-403, including roadside display devices (e.g., to identify the vehicle and driver, routes driven, driving speed, passengers in the car, etc.), on-board vehicle devices such as the driver's mobile phone (e.g., to confirm the timing of the text messages sent), and various external data sources (e.g., the driver's phone records, the driver's accident history, previous driving pattern data, statistics of traffic fatalities along the driver's route, etc.). The data received in steps 401-403 may be analyzed to determine an appropriate customized driving safety message for the driver based on his driving behaviors, and to determine the appropriate target times and devices on which to display the safety message. In this case, the customized safety message may be presented shortly after the driving trip along Route XYZ, in order to increase the chances that the message will attract the driver's attention.

Figure 6:
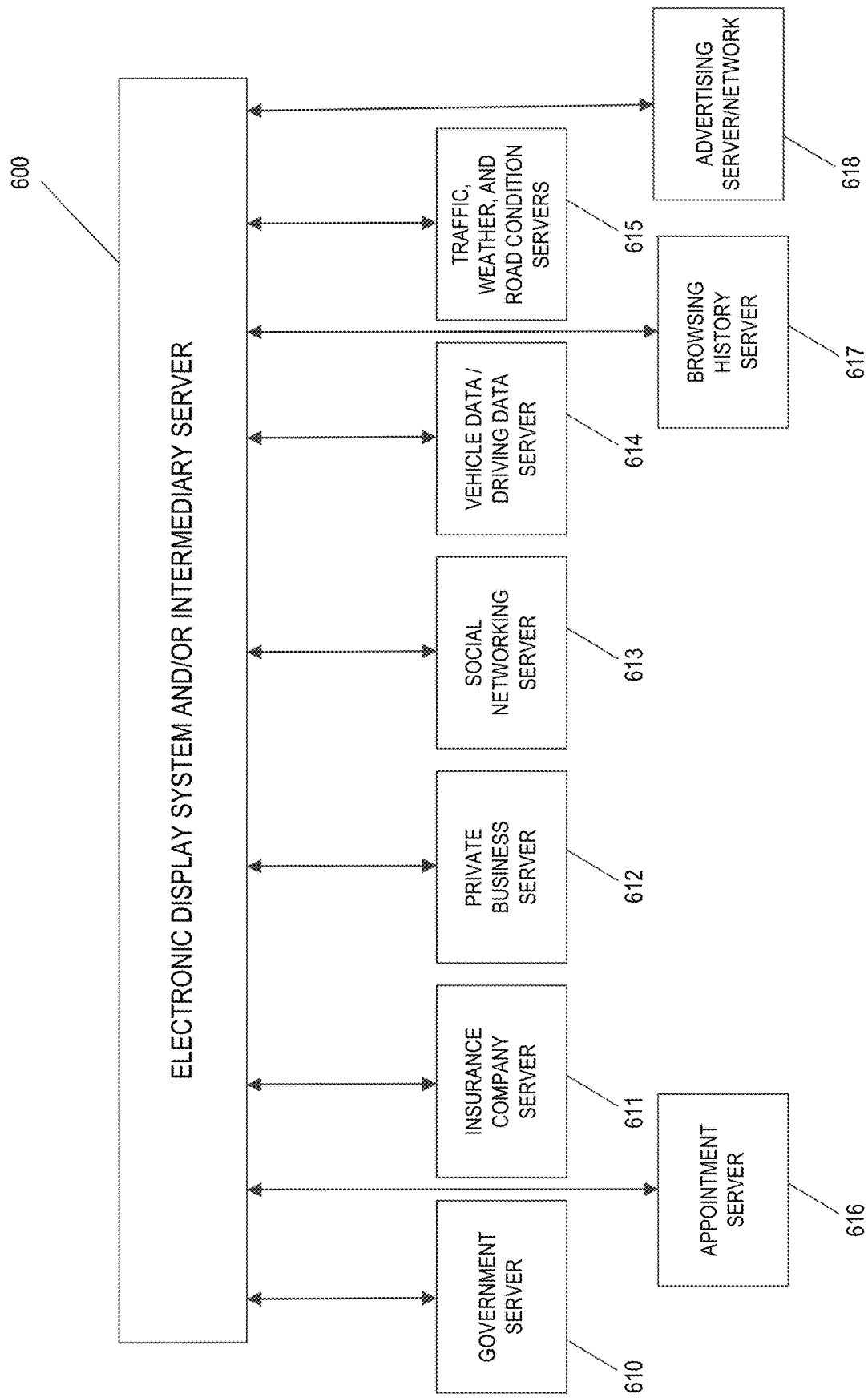
FIG. 6 is a block diagram illustrating a computing environment including a content output system and/or intermediary server in communication with a plurality of data source servers configured to provide data associated with a vehicle or individual, according to one or more aspects of the disclosure.

FIG. 5C shows a targeted advertisement for a discount on insurance displayed on a mobile device 500c. In this example, the targeted advertisement has been transmitted to the mobile device 500c and may be displayed to the user at any time and may be unrelated to a driving trip. Mobile device 500c may be, for example, the smartphone of an individual registered as a user with the content output system. In this case, the user may agree to receive content from the content output system based on various data related to the user and/or a vehicle associated with the user and/or based on the user's driving data. The advertising content, in this case, may be determined as described above in steps 401-404. For example, an advertising server and/or network, an intermediary server, or the smartphone 500c itself, may have received and analyzed various vehicle data, individual data relating to the user, and/or driving data, before selecting the insurance advertisement as the content to output and the smartphone 500c as the target device. The data received and analyzed in this case may include, for instance, the user's driving score. Alternatively, driving data may be received and analyzed and a driving score may be calculated based on the driving data. Based on the user's driving score, one or more advertisers may bid to provide an advertisement to the user. In this case, the winning bid may be from an advertiser wishing to provide the advertisement displayed on the mobile device 500c. Referring now to FIG. 6 a diagram is shown illustrating a first device 600 in the content output system, such as a roadside display device, intermediary server, content determination and display server, or advertising server/network in communication with a plurality of data source servers 610-617. As discussed herein, in certain embodiments, various data sources may be accessed to retrieve vehicle data, individual data, driving data, and the like, corresponding to the vehicles and individuals approaching certain roadside displays and other display devices and/or individuals registered with the content output system. Data source servers may be operated by one of the same entities controlling a content output system, or by third-party entities (e.g., insurance companies, financial institutions, governmental entities, corporate entities, etc.) that permit information queries based on vehicle data or individual data. As shown in FIG. 6, one or more devices 600 (e.g., a roadside display device, intermediary server, content determination and display server, advertising server/network, etc.) in a content output system may use vehicle-identifying information (e.g., license plate number and state, VIN, vehicle registration information, insurance policy data, etc.) and/or individual-identifying information (e.g., name, license number, social security number, mobile device number, etc.) in order to retrieve additional vehicle or individual characteristics, such as demographic data, financial data, insurance data, educational data, family data, personal data, driving data, purchase data, browsing history data, calendar data, appointment data, etc. Driving data may additionally be retrieved from various data sources. The data retrieved from such data sources may be used to determine what content may be output, as well as the device on which the content may be output.

Several examples of potential data sources 610-617 are discussed below. However, it should be understood that different combinations of data sources may be used in different content output systems. Additionally, the set of data sources queried may vary from vehicle-to-vehicle and individual-to-individual during operation of the content output system, for example, based on the type of identifying information available to begin a query (e.g., license plate number, vehicle make and model, driver name, physical characteristics of occupants, etc.), the particular telematics software applications installed on the mobile device of an individual or used by the individual, the access credentials of the querying devices within the content output system, the current availability, responsiveness, and latency of the data source servers, and the like.

Governmental server 610 may include one or more servers and other computing devices from various governmental entities. For example, data source 610 may represent federal, state, and local government servers operated by agencies such as a state department of motor vehicles, a property records office, a tax records office, a census office, or a law enforcement agency. In some cases, a device 600 (or other device described herein) within the content output system may establish a network connection with a governmental data source 610 and transmit a request with identifying information of a vehicle or individual, to receive back governmental information regarding the vehicle or individual. Thus, the device 600 may use governmental data sources 610 to retrieve vehicle registration records, stolen vehicle records, driving records, criminal history records, income and tax records, census data, and other governmental data relating to one or more vehicles or individuals approaching an electronic display within the system or registered with the system. The vehicle and individual information retrieved from a governmental data source 610 may be used, for example, in steps 204 and 214 of FIGS. 2A and 2B to determine targeted advertisements to be output based on demographic and financial data, driving safety reminders, and the like, via one or more devices.

Insurance company server 611 may include servers and other computing devices associated with insurance companies and other associated institutions. Device 600 (or other device described herein) within the content output system may establish a network connection with an insurance server 611 to request and retrieve information relating to vehicles or individuals approaching a roadside display or other display device within the system or registered with the system. For example, the device 600 may use the insurance company server 611 to retrieve existing or previous insurance policies of the individuals which were issued by the insurance company, coverage limits, previous accidents or other incidents relating to the vehicles or drivers, claims filed by or against the vehicle or driver, and the like. The vehicle and individual information retrieved from an insurance company data source 611 may be used, for example, in steps 204 and 214 of FIGS. 2A and 2B to determine an insurance advertisement or offer for a driver, other targeted advertisements, driving safety reminders, and the like, to be output via one or more devices.

Private business server 612 may include servers and other computing devices associated with various types of private enterprises and organizations. Device 600 (or other device described herein) within the content output system may establish a network connection with a private business data source 612 to request and retrieve information relating to vehicles and individuals that are approaching roadside displays or other display devices or are registered with the system, such as products and services purchased, times and dates of purchases, amounts spent, and the like. Data received from private business data sources 612 may be used to determine financial profile data, purchase habits, hobbies, travel, and lifestyle data which may be used in determining targeted advertisements for individuals to be output via one or more devices in the system.

Social networking server 613 may include servers and other computing devices associated with various online social network websites. Device 600 (or other device described herein) within the content output system may establish a network connection to a social networking data source 613 to request and retrieve information relating to an individual approaching a roadside display or other display devices (e.g., vehicle driver or passenger), an associated individual (e.g., vehicle owner or other authorized drivers), or an individual registered with the system. The data retrieved may include social networking profile information, friends or contacts, associated hobbies, activities, events, clubs, or other organizations, and the like. Such data from social networking data sources 613 may be used to determine targeted advertisements and other messages for individuals to be output via one or more devices in the system.

Driving data and/or driving pattern servers 614 may include servers and other computing devices configured to collect and store driving data corresponding to vehicles and individuals. In some cases, data sources 614 may be on-board vehicle computing devices (e.g., 310a-310c, 311a-311b, etc.), such as vehicle-based computers, telematics and navigation devices, smartphones of drivers, passengers, or individuals registered with the system, etc. Such devices may be configured to collect and store driving trips logs, driving statistics, vehicle operational data, accident records, etc., and may be queried by device 600 (or other device described herein) to retrieve such data. Data sources 614 also may include servers or devices separate from the vehicles or individuals, such as traffic servers, insurance servers, or governmental servers which may collect and store driving data or driving patterns for specified vehicles or individuals. The data retrieved from driving data and driving pattern data sources 614 may be used to determine targeted advertisements (e.g., based on anticipated driving route and intended destinations), or provide driving safety alerts and other messages for individuals to be output via one or more devices in the system.

Driving conditions data sources 615, which may include traffic servers, weather servers, road condition servers, and other computing devices, may be configured to store and provide driving condition data associated with specific locations and driving routes. For example, various driving conditions data sources 615 may include servers storing traffic data, weather data, road condition data, data relating to other road hazards and/or other driving conditions. Such driving condition data may be stored based on location (e.g., address or GPS coordinates), or street name and/or cross street, or based on point-to-point driving routes. Additional driving conditions data sources 615 may include data sources storing records of accidents and/or insurance claims filed, and other data sources 615 may store records regarding driving routes, such as driving times for specific stretches of roads and/or specific driving routes, including driving time data for different months, days, and times of the day, and data for different weather conditions, road conditions, and traffic conditions, etc. A device 600 (or other device described herein) in the content output system may establish a network connection with a driving condition data source 615 to request and retrieve information relating to the current or upcoming driving routes, characteristics of the intended destinations and driving routes associated with the vehicle or individual (e.g., frequently driven roads and routes, and corresponding days and times the customer drives, etc.). Such data may be retrieved from driving conditions data sources 615 in order to determine traffic alerts, weather alerts, road construction alerts, suggested alternative routes to a vehicle's intended destination, and the like, which may be used in determining targeted advertisements to be output via one or more of the devices in the system.

Appointment data sources 616 may include calendar data servers, time and date servers, location servers, and the like and may be configured to store and provide appointment information associated with a user. For example, various appointment data sources 616 may include servers storing particular appointment information for a user, time and date information, provider information, other party information, and the like. Such information may be stored based on time and date of appointment, location of appointment (e.g., address, GPS coordinates, cross streets, etc.), etc. A device 600 (or other device described herein) in the content output system may establish a network connection with an appointment data source 616 to request and retrieve information relating to one or more upcoming appointments associated with the vehicle or individual. Such data may be retrieved from appointment data sources 616 to determine content to provide to a user, determine a device or type of device on which to output content, determine a time at which to output content on a particular device, and the like.

Browsing history data sources 617 may include internet purchase servers, website servers, and the like, and may be configured to store and provide information associated with a browsing and/or internet purchase history of a user. For example, various browsing history sources 617 may include servers storing particular websites visited, items viewed, items purchased, length of time a website was viewed, length of time a product or service was viewed, and the like. Such information may be stored based on type of website, type of product or service viewed or purchase, and the like. A device 600 (or other device described herein) in the content output system may establish a network connection with a browsing history data source 617 to request and retrieve information relating to internet browsing history, purchase history, and the like, of an individual. Such data may be used to determine content to provide to a user, a type of device on which to output content, and the like.

Advertising data sources 618 may include advertising servers and/or networks, and may be configured to store and provide content associated with advertisements or other messages. The advertising servers/networks may be a component of a real-time auction and may be configured to manage and coordinate a bidding process between advertisers and publishers. A device 600 (or other device described herein) in the content output system may establish a network connection with an advertising data source 617 to request and retrieve information relating to advertisements. Such data may be used to determine content to provide to a user, a type of device on which to output the content, and the like.

Figure 7:
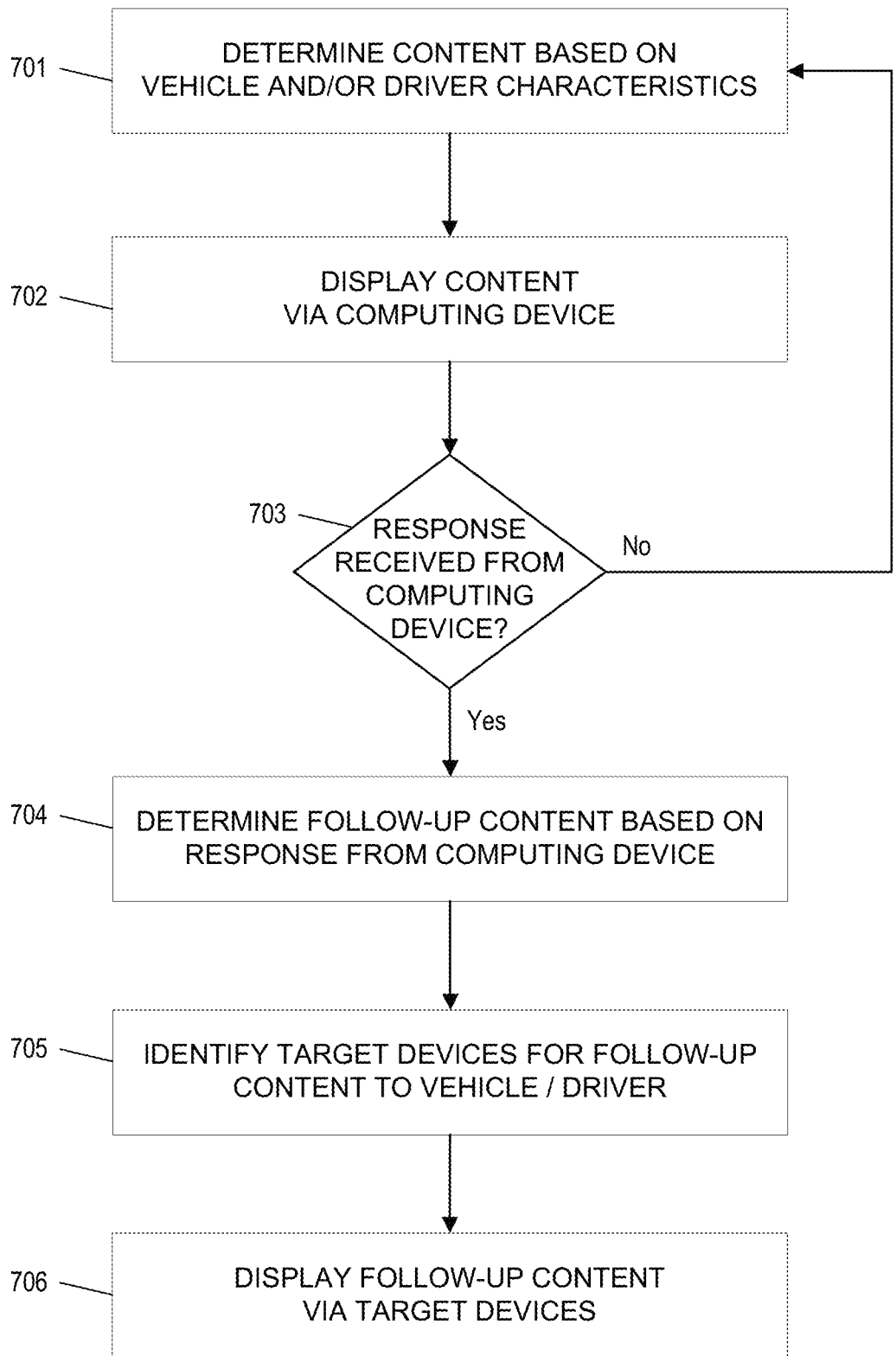
FIG. 7 is a flow diagram illustrating an example method of displaying follow-up content to a vehicle or individual, based on a received response to initial digital content displayed via a display device, according to one or more aspects of the disclosure.

FIG. 7 is a flow diagram illustrating an example method of receiving a response to content displayed via an electronic display device, and determining and displaying follow-up content based on the response. The various embodiments and examples described in connection with FIG. 7 may be implemented using a number of computing systems (e.g., any of FIGS. 3A-3E of FIGS. 5A-5C), operating individually or in combination, such as electronic roadside displays, on-board vehicle systems, intermediary servers, portable mobile devices, and other computing devices. Each of the computing devices and systems in these examples may include some or all of hardware, software, and networking components as the illustrative computing device 101 described in FIG. 1.

In step 701, content is determined for outputting on one or more devices, such as an electronic roadside display (e.g., 300a, 300b, etc.), a portable computing device (e.g., 300e), a television, a home computing device, a vehicle-based device, a radio, etc., based on the characteristics of one or more vehicles or individuals and/or telematics data. Thus, step 701 may be similar or identical to steps 204, 214, and/or 404, discussed above. In various examples, the content determined in step 701 may correspond to targeted advertisements, vehicle maintenance suggestions, driving safety warnings, and notifications about upcoming driving conditions. Additionally, as discussed above, the determination in step 701 may be performed by any of several different system components, such as an electronic roadside display, a vehicle-based computing system, a user's smartphone or other mobile device, an intermediary server, an advertising server/network, or any combination of these devices.

In step 702, the digital content determined in step 701 may be displayed on one or more appropriate electronic display devices, such as electronic roadside displays, portable computing devices, televisions, home computing devices, vehicle-based devices, etc., within the system, at the appropriate times to be viewable by the vehicles and individuals whose characteristics and/or telematics data were received and analyzed in step 701. Thus, step 702 may be similar or identical to steps 205, 215, and/or 406, discussed above.

In step 703, a response may be received via an on-board vehicle computing device (e.g., 310b-312b, etc.) or other computing device, such as a portable computing device (e.g., 300e), to the content displayed via an electronic display device in step 702. In some cases, in order to receive a response in step 703, a user interface may be rendered on one or more on-board vehicle computing devices or other computing devices, such as a portable computing device, concurrently with the digital content being displayed on the electronic display device in step 702. In such cases, a vehicle driver, a passenger, or other individual, in response to viewing the content on the electronic display device, may respond via the user interface. The on-board vehicle computing device may correspond to a vehicle-based computer (e.g., vehicle computer or diagnostic system, telematics device, navigation system, etc.), or to a user's mobile device (e.g., a smartphone or portable computer of a driver or passenger). The on-board vehicle computing device or other computing device may receive a signal, and/or user interface content, from an electronic display device (e.g., 300a, 300b, 300e, etc.) or an intermediary server (e.g., 320c, 320d, etc.) at or near the same time that the determined content is displayed on the electronic display device.

When the electronic roadside display device or other device supports user responses and interactivity with on-board vehicle devices or other computing devices, such devices may be used to present questions or product offers to vehicle occupants or other individuals, and then receive answers from users via their on-board vehicle devices or other computing devices. For example, a roadside display may display a targeted advertisement for Product ABC along with a question for users (e.g., "Would you like to receive more information about Product ABC?"), or may inquire about the vehicle's destination and offer information or assistance (e.g., "Are you going to the XYZ Shopping Mall? If so, would you like a parking recommendation based on the current parking garage availability?"). In these examples, the user interface displayed on the on-board vehicle device or other computing device may be a generic user interface that is not specific to the content displayed on the roadside display (e.g., a simple "Yes" or "No" screen to allow the user to respond to the question). In other examples, an electronic roadside display, intermediary server, advertising server/network, or other device in the system may transmit a customized response user interface to one or more on-board vehicle devices or other computing devices when the targeted advertisement or other message is displayed on the roadside display. Customized response user interfaces may allow users to provide specific responses to questions or other content on an electronic display device (e.g., "How much are you currently paying for car insurance? Enter your current rate now to receive a quote." or "Are you looking for nearby store or restaurant? Speak the name now to get directions."). As these examples illustrate, responses may be received by the on-board vehicle device or other computing device via spoken voice input from the driver, a passenger, or other individual, via typed or touch screen input, or other input technique. In still other examples, a driver's response might not be received via an on-board vehicle device or other computing device, but rather may be received based on the route the driver takes after passing the roadside display (e.g., "Take Exit 8 to receive additional information about local hotels with vacancies tonight."). In this example, the system displaying the digital content may presume an affirmative response by the driver if the vehicle follows a route suggested by the initial digital content.

In step 704, if a user response is received via an on-board vehicle device or other computing device (703:Yes), then follow-up digital content may be determined for the user that responded, based on the user's response and/or the characteristics of the user's vehicle or the occupants in the user's vehicle and/or the telematics data. In some cases, a specific user response is required in order for follow-up content to be determined in step 704. For example, if the initial digital content displayed on the electronic display device asks the user if they would like to receive additional information relating to a product or server, then only users answering "Yes" will receive follow-up information. In this example, the follow-up information determined in step 704 may include additional details and/or contact information relating to the product or service displayed in step 702. As another example, if the initial digital content displayed on an electronic display device asks the user if they need directions or a suggested route to a destination, then the follow-up information determined in step 704 may include the directions and suggested driving route based on the current day and time, current weather and traffic conditions, other warnings or alerts, etc. Additionally, if the initial digital content displayed on an electronic display device asks the user for information about a current product or service of the user (e.g., the user's mobile provider and current contact term, the user's insurance company and current rates, etc.), then the follow-up information determined in step 704 may include an offer or other incentive for the user to switch products or services, in which the offer or incentive is based on the information that the user input in step 703.

Additionally, the follow-up content determined in step 704 may be further based on the vehicle and individual characteristics and/or telematics data associated with an on-board vehicle device or other computing device from which the response was received. For example, if a group of ten vehicles is identified as approaching the same electronic roadside display, then the initial content determined for the display in step 701 may be based on characteristics and/or telematics data of some or all of the ten vehicles and/or their occupants (e.g., using aggregation techniques or prioritizing different characteristics, as discussed above in step 204). However, if only one or a few of the ten vehicles responds to the initial content in step 703, then the follow-up content determined in step 704 may be based on the characteristics and/or telematics data associated with the responding vehicles and/or individuals, while excluding the vehicles and/or individuals that did not respond to the initial content.

In step 705, one or more target devices are determined on which to display the follow-up digital content determined in step 704. In some cases, a second roadside display may be selected in step 705 to display the follow-up content. For example, if two electronic roadside displays are positioned a mile apart on the same road or highway, then the initial digital content may be displayed on the first roadside display, and after responses are received from one or more on-board vehicle devices or other computing devices, the determined follow-up content may be displayed on the second roadside display. In other examples, the driving routes and intended destinations may be determined for any vehicles responding to the initial digital content in step 703, and a second roadside display may be selected along a vehicle's anticipated driving route. Therefore, when two vehicles respond to the same digital content on the same roadside display, the follow-up content may be sent to the two vehicles using different roadside displays based on the different anticipated driving routes and destinations of the two vehicles.

Additionally, in some cases, the follow-up content determined in step 704 may be transmitted to another computing device associated with a responding user, rather than to an electronic roadside display. For example, the follow-up content determined in step 704 (e.g., additional product information, directions to an intended destination, etc.) may be transmitted back to the on-board vehicle device or other computing device that received the user's response in step 703. Thus, when a user responds via a vehicle-based computing device or other computing device, the follow-up content may be transmitted by an electronic roadside display, intermediary server, advertising server/network, or other communications network device, to the same vehicle-based computing device or other computing device. Similarly, users responding to the initial content using their mobile devices may receive the follow-up content via their mobile devices.

In still other cases, the follow-up content determined in step 704 may be transmitted to another computing device or account associated with the responding user. For example, a user responding to an electronic roadside advertisement via a vehicle device or other computing device (e.g., vehicle console computer, navigation or telematics device, etc.) may receive the determined follow-up data transmitted to their personal mobile device (e.g., smartphone or other personal portable device). In this example, the follow-up data may be transmitted by text message, a short-message-service (SMS) message, or via a mobile software application on the user's mobile device. The follow-up content also may be sent via email, for example, after retrieving an email address for the user(s) responding to the content in step 703 from one or more external data sources. In such cases, an initial determination may be performed to identify which individual(s) provided the response to the electronic display device in step 703. Such determinations may be performed by requiring to user to self-identify during the response, by using voice recognition techniques to identify spoken responses, among other techniques. Alternatively, when the specific individual(s) responding via a vehicle-based device or other computing device cannot be determined, the follow-up content may be sent by default to the vehicle driver, vehicle owner, or to each of vehicle's occupants.

In step 706, after determining the follow-up digital content to transmit to user(s) responding to the initial roadside display content, and identifying the target device(s) on which the follow-up content should be provided to the user(s), the follow-up content may be transmitted to and/or displayed on the identified target devices.

Figure 8:
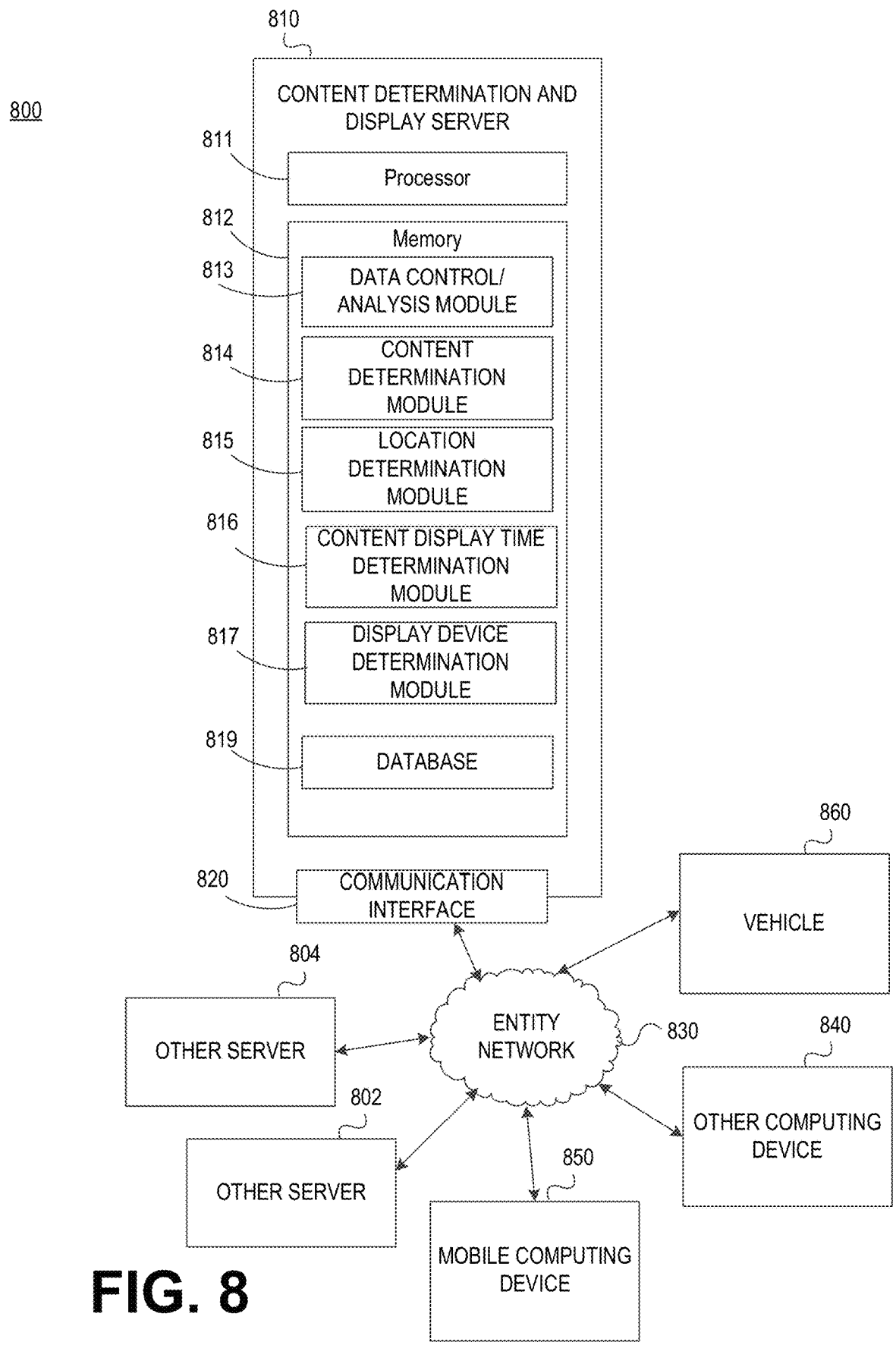
FIG. 8 depicts an illustrative content output system including a content determination and display server according to one or more aspects described herein.

FIG. 8 depicts an environment 800 including illustrative devices and components for determining content for display, determining a device or location for display, and the like, according to one or more aspects described herein. For instance, the environment 800 includes a content determination and display server 810, which may include one or more processors 811, memory 812, and communication interface 820. The content determination and display server 810 may be similar to various other computing devices described herein (e.g., device 600, device 101, etc.). A data bus may interconnect processor(s) 811, memory 812, and communication interface 820. Communication interface 820 may be a network interface configured to support communication between content determination and display server 810 and one or more networks (e.g., network 830). One or more computing or other devices, servers, etc. 802, 804, 840, 850, 860 may be in communication with the content determination and display server 810 (e.g., via network 830). Memory 812 may include one or more program modules having instructions that when executed by processor(s) 811 cause the content determination and display server 810 to perform one or more functions described herein, and/or one or more databases 819 that may store and/or otherwise maintain information which may be used by such program modules and/or processor(s) 811. In some instances, the one or more program modules and/or databases may be stored by and/or maintained in different memory units of content determination and display server 810 and/or by different computer systems or devices that may form and/or otherwise make up the content determination and display server 810. The content determination and display server 810 may describe an advertising server/network. In some arrangements, different features or processes performed may be performed by different sets of instructions, such that the processor may execute each desired set of instructions to perform different functions described herein.

As discussed above, memory 812 may include one or more program modules including hardware and/or software configured to perform various functions within the content determination and display server 810. For instance, memory 812 may include data control/analysis module 813. The data control/analysis module 813 may receive data from one or more sources (e.g., raw sensor signals or data, metadata, geo-tagged location data, global positioning system data, user data, vehicle data, and the like) and may process the data. The processed data may be used by the data control/analysis module 813, as well as other modules, to determine content for display, determine a display location, determine a length of time of display of content, a start time and stop time of content display, and the like, as will be discussed more fully herein.

The data control/analysis module 813 may receive data from one or more other servers 802, 804. Other servers 802, 804 may include data related to a user (e.g., a user of a vehicle, a device, etc.) as well as other publicly available data. In some examples, the other servers 802, 804 may be servers similar to those discussed with respect to FIG. 6. The other servers 802, 804 may also describe advertising servers/networks. Data (either raw data or processed data) may be received from one or more other servers 802, 804 and may be processed by the data control/analysis module 813.

Data may also be received from one or more mobile computing devices 850 or application software installed thereon. As will be discussed more fully herein, data related to location information (e.g., from geo-tagged location data, from metadata, from GPS data, etc.) may be received from the mobile computing device 850 and used to determine a current location of a user, as well as other characteristics or features of a user. Additionally or alternatively, other sensor data may be received from one or more sensors within the mobile computing device 850 (e.g., accelerometers, gyroscopes, etc.) and may be processed by the data control/analysis module 813.

In still other examples, data related to user behaviors, habits, upcoming events, navigation routes, and the like, may be received. For instance, data may be received from one or more calendar applications on the mobile computing device 850. This information may be processed by the data control/analysis module 813 to identify one or more future destinations or locations of a user.

The data control/analysis module 813 may receive data from one or more other computing devices 850. For instance, the data control analysis module 813 may receive data from one or more other mobile devices, devices associated with individuals other than a user (e.g., family, friends, etc.), and the like. In some examples, the other computing devices 850 may include infrastructure along one or more travel routes that may collect information related to weather, traffic, and the like. This information may be transmitted to the content determination and display server 810.

The data control/analysis module 813 may also receive data from one or more vehicles 860, as discussed more fully herein. For instance, sensor data, driving behavior data, location data, and the like, may be received from a vehicle 860 associated with a user, from other vehicles, etc.

In some examples, the data control/analysis module 813 may control an amount or type of data received from one or more other devices for processing. For instance, the data control/analysis module 813 may determine one or more future locations of a user and may limit the data received from one or more devices to only data related to areas between the current location of a user and the determined location (e.g., receive only traffic data related to the areas between the current location and the future location, receive only weather data for that area, etc.). Accordingly, the server may reduce an amount of data to be processed by receiving (or requesting) the data related to a particular area or from particular sensors or devices rather than all data collected by one or more devices.

The memory 812 may further include a content determination module 814. The content determination module 814 may receive processed data from the data control/analysis module 813 and may determine one or more types or pieces of content for display or distribution to a user. For instance, based on received calendar data and associated location data, the server 810 may determine a particular type of errand a user is performing. The content determination module 814 may then select content for display or distribution to the user based on the determined type of errand.

Additionally or alternatively, data received by the server 810 may include information related to user purchase habits and the like. Accordingly, the content determination module 814 may select one or more types or pieces of content related to products, services, or the like, purchased by or researched by the user.

Various other methods of determining content as discussed herein may be used as well.

The memory 812 may further include a location determination module 815. The location determination module 815 may receive location information from one or more devices (either via data control analysis module 813 or directly) to determine a location of a user (either based on mobile device 850 location, vehicle 860 location, or the like). The location information may be used to determine one or more devices to display content or to which content may be distributed, as will be discussed more fully herein.

Content determination and display server 810 may further include a content display time determination module 816. The content display time determination module 816 may determine a length of time content will be displayed on a particular device for a user. Similar to various other arrangements discussed herein related to determining start time and stop time for content display, the content display time determination module 816 may determine, based on location of the user, speed at which the user is travelling (e.g., based on designated speed limit on a road, vehicle operational data related to speed of a vehicle, etc.), type of road on which a display device is arranged or on which the user is travelling, current traffic data for the road or area, and the like, an amount of time for which the determined content should be displayed. The length of time the content is displayed may include providing the determined content for a longer or shorter period of time than previously determined (e.g., by content determination module 814). For instance, in determining the content for display or distribution, the content display module 814 may also determine a length of time of display or an amount of content for display that will consume a particular amount of time. The content display time determination module 816 may modify the initially determined length of time (either shorten or lengthen) and, in some examples, may communicate with content determination module 814 to modify the determined content for display, select additional content, etc.

Server 810 may further include display device determination module 817. The display device determination module 817 may determine one or more devices on which to display the determined content, or to which the determined content should be distributed. For instance, if, based on processed data, it is determined that a user has an appointment at address B and has just passed address or location A, the display device determination module 817 may identify one or more devices (e.g., roadside electronic display devices) having a location between address B and address or location A on which to display the content. Additionally or alternatively, the display device determination module 817 may identify one or more mobile devices, such as mobile device 850, to which to distribute the determined content and may identify a time at which to distribute the content (e.g., based on arrival at location A, a location at which the driver may be stopped due to traffic, or the like).

The content determination and display server 810 may further include one or more databases 819 storing information about one or more users (e.g., contact information, insurance information, demographic information, and the like) as well as one or more vehicle associated with the user (e.g., make, model, year, etc.). This information may also be used in one or more determinations discussed herein.

Figure 9:
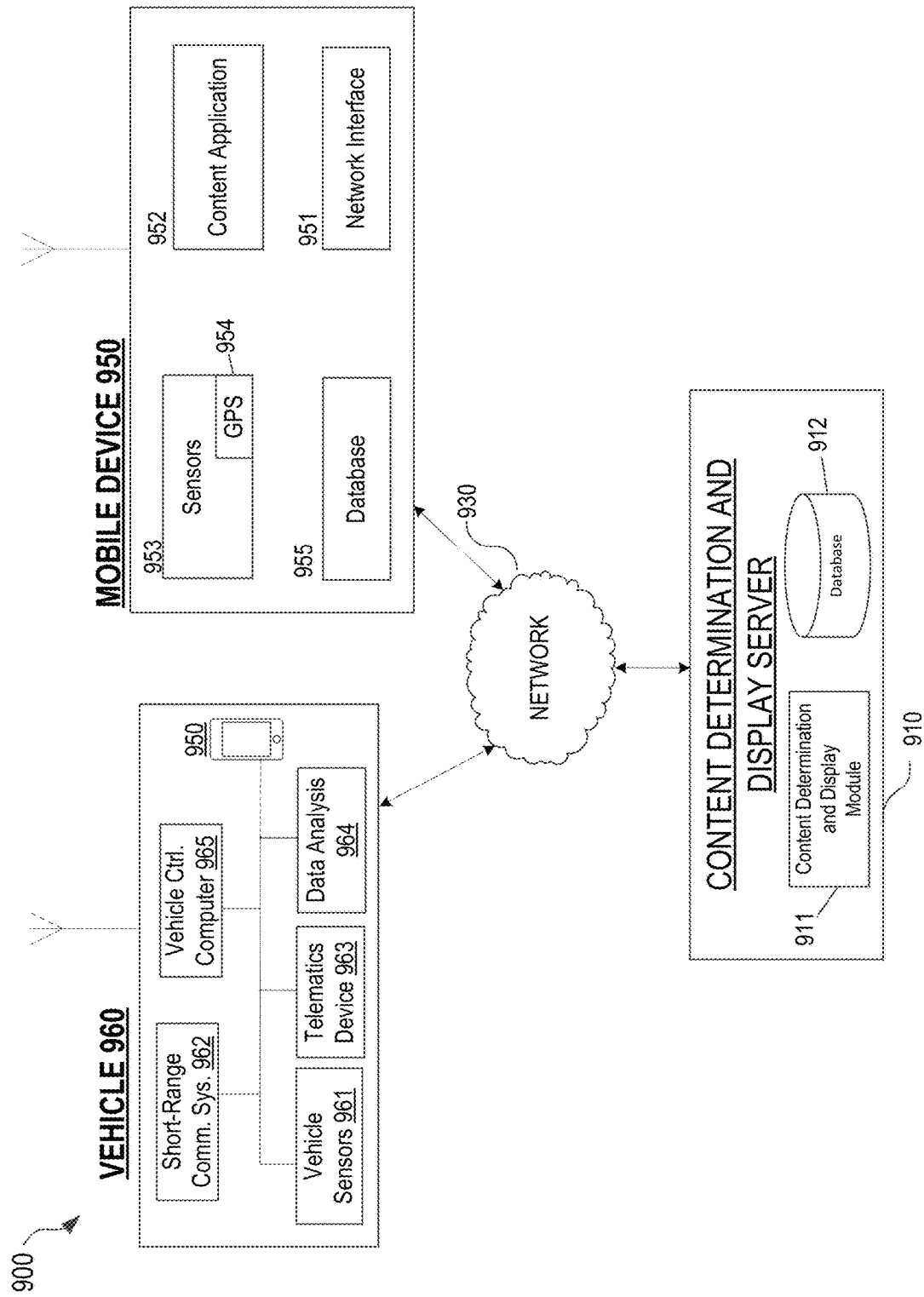
FIG. 9 illustrates various components and devices of a content determination and display system according to one or more aspects described herein.

FIG. 9 is a diagram of an illustrative content determination and display system 900 that may be similar to or include one or more components or perform one or more functions similar to content output systems described herein. The content determination and display system 900 includes a vehicle 960, a mobile device 950, a content determination and display server 910, and additional related components. Each component shown in FIG. 9 may be implemented in hardware, software, or a combination of the two. Additionally, each component of the content determination and display system 900 may include a computing device (or system) having some or all of the structural components described herein for computing device 101 in FIG. 1. The content determination and display system 900 may also include or be in communication with one or more servers, devices, and the like, shown and described with respect to FIG. 8.

One or more components shown in FIG. 9, such as the vehicle 960 and the user personal mobile device 950 may communicate with each other via wireless networks or wired connections (e.g., for devices physically docked in vehicles), and each may communicate with the content determination and display server 910, one or more additional vehicles, additional mobile computing devices, and/or external computer servers, over one or more communication networks 930.

As discussed herein, the components of content determination and display system 900, operating individually or using communication and collaborative interaction, may perform such features and functions such as determining a location of a vehicle, determining content for display based on received data, determining a projected or future location of a user, identifying a device on which to display content or to which content will be distributed, and the like.

Content determination and display system 900 may include one or more mobile computing devices 950. Mobile device 950 may be, for example, smartphones or other mobile phones, personal digital assistants (PDAs), tablet computers, laptop computers, wearable devices such as smart watches and fitness monitors, and the like. User personal mobile device 950 may include some or all of the elements described herein with respect to the computing device 101 in FIG. 1.

The mobile computing device 950 may include a network interface 951, which may include various network interface hardware (e.g., adapters, modems, wireless transceivers, etc.) and software components to enable mobile device 950 to communicate with content determination and display server 910, vehicle 960, and various other external computing devices. One or more specialized software applications, such as content applications 952 may be stored in the memory of the mobile device 950. The content application(s) 952 may be received via network interface 951 from the content determination and display server 910, vehicle 960, or other application providers (e.g., public or private application stores). Certain content applications 952 might not include user interface screens while other content applications 952 may include user interface screens that support user interaction. Such content applications 952 may be configured to run as user-initiated applications or as background applications. The content applications 952 may include one or more telematics applications The memory of mobile device 950 also may include databases configured to receive and store sensor data received from mobile device sensors, usage data, location data received from GPS device, user data, browser data, purchase data, and the like. Although aspects of the content software application(s) 952 are described as executing on mobile device 950, in various other implementations, some or all of the functionality described herein may be implemented by device usage and evaluation server 910.

As discussed herein, mobile device 950 may include various components configured to generate and/or receive data associated the mobile device 950. For example, using data from sensors 953 (e.g., 1-axis, 2-axis, or 3-axis accelerometers, compasses, speedometers, vibration sensors, gyroscopic sensors, etc.) and/or GPS receivers or other location-based services (LBS) 954, an application 952 (or other device or module, e.g., content determination and display server 910) may determine movement of the mobile device 950 (e.g., in a vehicle, with a user who is walking, with a user who is running, etc.). The sensors 953 and/or GPS receiver or LBS component 954 of a mobile device 950 may also be used to determine driving speeds, routes, navigation routes, etc.

Mobile device 950 may further include a database 955. The database 955 may include data retrieved from one or more applications executing on the mobile device 950. For instance, the database 955 may store data associated with one or more calendar appointments, or other information that may be used to determine a future location of the user. In some examples, data may be retrieved from database 955 by the mobile device 955 and processed while in other examples the data may be transmitted to content determination and display server 910 for processing.

The mobile device 950 may be configured to establish communication with content determination and display server 910 via one or more wireless networks (e.g., network 930). Additionally or alternatively, the mobile device, when carried in a vehicle, may be used (e.g., sensors 953 in mobile device may be used) to detect performance and/or operational characteristics of the vehicle 960, similar to the one or more sensors arranged in the vehicle 960. The detection of the performance and/or operational characteristics of the vehicle 960 by the mobile device 950 may be performed by the hardware, software, or a combination of the two.

Content determination and display system 900 may further include a vehicle 960. Vehicle 960 may be, for example, automobiles, motorcycles, scooters, buses, recreational vehicles, boats, or any other vehicles for which driving behaviors may be analyzed. Vehicle 960 may include vehicle operation sensors 961 capable of detecting and recording various conditions at the vehicle and operational parameters of the vehicle. For example, sensors 961 may detect and store data corresponding to the vehicle's location (e.g., GPS coordinates), time, travel time, speed and direction, rates of acceleration or braking, gas mileage, and specific instances of sudden acceleration, braking, swerving, and distance traveled. Sensors 961 also may detect and store data received from the vehicle's 960 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle on-board computing device (OBD).

Additional sensors 961 may detect and store the external driving conditions, for example, external temperature, rain, snow, light levels, and sun position for driver visibility. For example, external cameras and proximity sensors 261 may detect other nearby vehicles, vehicle spacing, traffic levels, road conditions, traffic obstructions, animals, cyclists, pedestrians, and other conditions that may relate to vehicle accidents and accident characteristics. Sensors 961 also may detect and store data relating to moving violations and the observance of traffic signals and signs by the vehicle 960. Additional sensors 961 may detect and store data relating to the maintenance of the vehicle 960, such as the engine status, oil level, engine coolant temperature, odometer reading, the level of fuel in the fuel tank, engine revolutions per minute (RPMs), software upgrades, and/or tire pressure.

Vehicles sensors 961 also may include cameras and/or proximity sensors capable of recording conditions inside or outside of the vehicle 960. For example, internal cameras may detect conditions such as the identity of the driver (e.g., using facial recognition software), the number of the occupants, the types of occupants (e.g. adults, children, teenagers, pets, etc.), and the seating/positioning of the occupants in the vehicles. Internal cameras also may detect potential sources of driver distraction within the vehicle, such as pets, phone usage, and unsecured objects in the vehicle. Sensors 961 also may be configured to collect data identifying a current driver from among a number of different possible drivers, for example, based on driver's seat and mirror positioning, driving times and routes, radio usage, etc. Sensors 961 also may be configured to collect data relating to a driver's movements or the condition of a driver. For example, vehicle 960 may include sensors that monitor a driver's movements, such as the driver's eye position and/or head position, etc. Additional sensors 961 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer.

Certain vehicle sensors 961 also may collect information regarding the vehicle's location, current and past driving routes, in order to classify the type of trip (e.g. work or school commute, shopping or recreational trip, unknown new route, etc.). In certain embodiments, sensors and/or cameras 961 may determine when and how often the vehicle 960 stays in a single lane or stray into other lanes. A Global Positioning System (GPS), locational sensors positioned inside the vehicle 960, and/or locational sensors or devices external to the vehicle 960 may be used to determine the route, lane position, road-type (e.g. highway, entrance/exit ramp, residential area, etc.) and other vehicle position/location data which may be used to analyze accidents and accident characteristics.

The data collected by vehicle sensors 961 may be stored and analyzed within the respective vehicle 960, for example, in vehicle data analysis device 964, which may be integrated into or installed at the vehicle 960. In other cases, the data collected by vehicle sensors 961 may be transmitted to one or more external devices for analysis, such as a mobile device 950 or content determination and display server 910. Additionally, as shown in FIG. 9, sensor data from one vehicle 960 may be transmitted via a short-range communication system 962 to other nearby vehicles, devices, infrastructure, and the like, and vice versa. The sensor data also may be transmitted from vehicles 960 via a telematics device 963 or other network interface(s) to one or more remote computing devices, such as one or more mobile devices 950, content determination and display server 910, and/or other external servers.

As discussed herein, short-range communication systems 962 may be vehicle-based data transmission systems configured to transmit various (e.g., driving data, vehicle data, insurance data, driver and passenger data, etc.) to other nearby vehicles, and to receive corresponding data from other nearby vehicles. In some examples, communication systems 962 may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication systems 962 need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. The vehicle-to-vehicle (V2V) transmissions between the short-range communication systems 962 may be sent via DSRC, Bluetooth, satellite, GSM infrared, IEEE 802.11, WiMAX, RFID, and/or any suitable wireless communication media, standards, and protocols. In certain systems, short-range communication systems 962 may include specialized hardware installed in vehicle 960 (e.g., transceivers, antennas, etc.), while in other examples the communication systems 962 may be implemented using existing vehicle hardware components (e.g., radio and satellite equipment, navigation computers) or may be implemented by software running on the mobile device 950 of drivers and/or passengers within the vehicle 960.

V2V communications also may include vehicle-to-infrastructure (V2I) communications, such as transmissions from vehicles to non-vehicle receiving devices, for example, toll booths, rail road crossings, and road-side traffic monitoring devices. Certain V2V communication systems may periodically broadcast data from a vehicle 960 to any other vehicle, or other infrastructure device capable of receiving the communication, within the range of the vehicle's transmission capabilities. The range of V2V communications and V2I communications may depend on the wireless communication standards and protocols used, the transmission/reception hardware (e.g., transceivers, power sources, antennas), and other factors. Short-range V2V (and V2I) communications may range from just a few feet to many miles, and different types of vehicle data and characteristics or behaviors may be determined depending on the range of the V2V communications.

When vehicle performance or operational data, or any other data is transmitted by vehicle 960, the transmission may depend on the protocols and standards used for the V2V and V2I communication, the range of communications, and other factors. In certain examples, vehicle 960 may periodically broadcast corresponding sets of similar vehicle data, such as the vehicle's location (which may include an absolute location in GPS coordinates or other coordinate systems, and/or a relative location with respect to another vehicle or a fixed point), speed, and direction of travel. In certain examples, the nodes in a V2V communication system (e.g., vehicles and other reception devices) may use internal clocks with synchronized time signals, and may send transmission times within V2V communications, so that the receiver may calculate its distance from the transmitting node based on the difference between the transmission time and the reception time. The state or usage of the vehicle's 960 controls and instruments may also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as detection by the vehicle's 960 internal systems that the vehicle is skidding, that an impact has occurred, or that the vehicle's airbags have been deployed, also may be transmitted in V2V communications.

As shown in FIG. 9, vehicle 960 may use telematics devices 963 to transmit data to and receive data from content determination and display server 910, and/or mobile devices 950. Telematics devices 963 may be computing devices containing many or all of the hardware/software components as the computing device 101 depicted in FIG. 1. In some cases, telematics devices 963 may receive vehicle sensor data, operation data, and driving data from vehicle sensors 961, and may transmit the data to one or more external computer systems (e.g., content determination and display server 910, or the like) over a wireless transmission network 930. The telematics devices 963 also may store the type of their respective vehicle 960, for example, the make, model, trim (or sub-model), year, and/or engine specifications, as well as other information such as vehicle owner or driver information, insurance information, warranty information, and financing information for the vehicle 960.

In the example shown in FIG. 9, telematics devices 963 may receive data from vehicle sensors 961, and may transmit the data to a mobile device 950 or content determination and display server 910. However, in other examples, one or more of the vehicle sensors 961 or other vehicle-based systems may be configured to receive and transmit data directly from or to other servers 910 or mobile device 950 without using a telematics device. For instance, telematics devices 963 may be configured to receive and transmit data from certain vehicle sensors 961 or systems, while other sensors or systems may be configured to directly receive and/or transmit data to server 910 or mobile device 950 without using the telematics device 963. Thus, telematics devices 963 may be optional in certain embodiments.

The system 900 also may include one or more external servers, such as content determination and display server 910, which may contain some or all of the hardware/software components as the computing device 101 depicted in FIG. 1. Content determination and display server 910 may communicate with vehicle 960 and mobile devices 950 via one or more communication networks 930.

The content determination and display server 910 may include some or all of the components and/or functionality described with respect to FIG. 8. The server 910 may include one or more databases 912 configured to store data associated with a user, vehicle, or the like. Further, the server 910 may include content determination and display module 911 which may provide some or all of the operations and/or functionality described with respect to FIG. 8. The content determination and display server 910 may further describe an advertising server.

Figure 10:
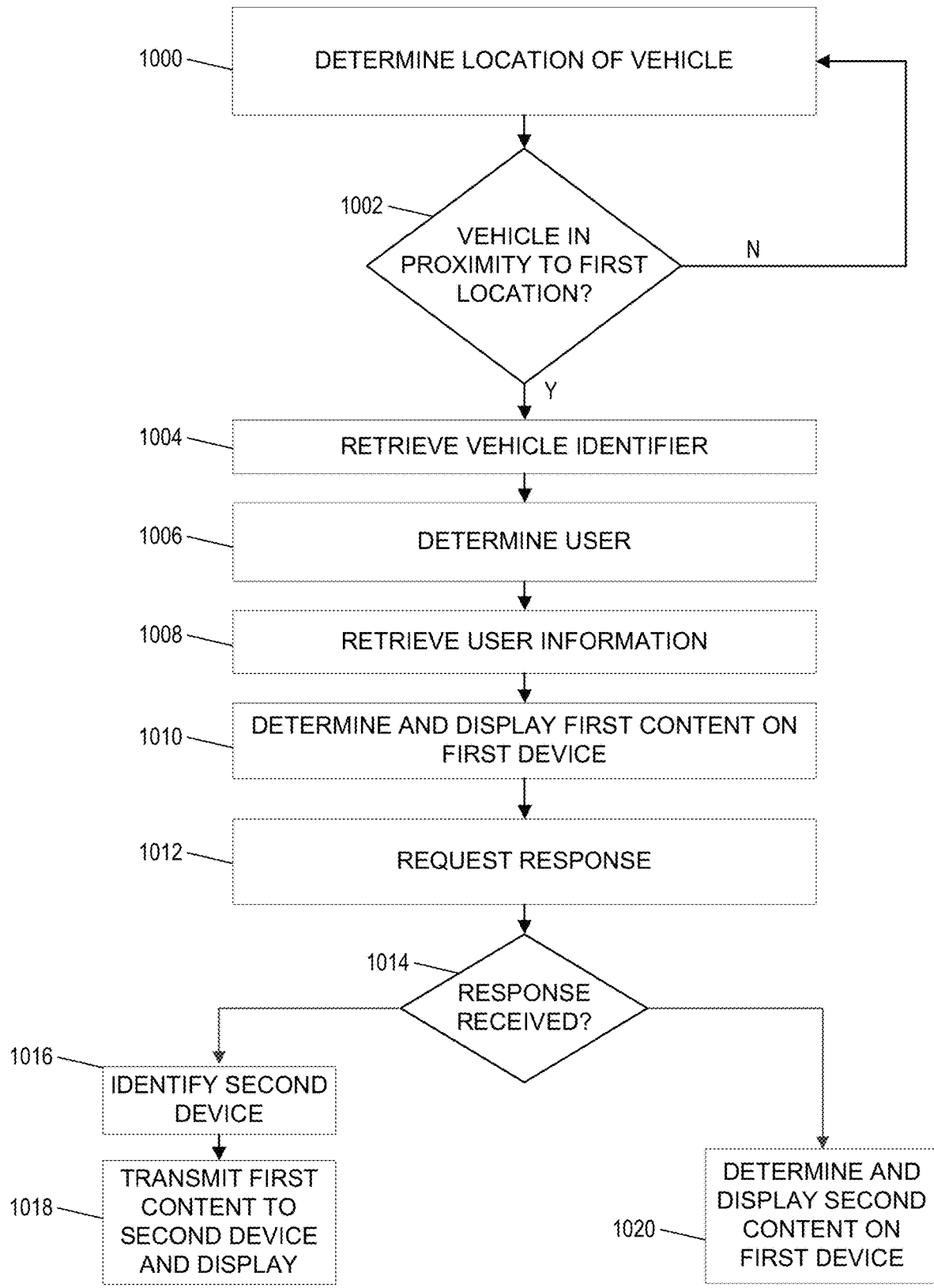
FIG. 10 illustrates one example method of determining and displaying content according to one or more aspects described herein.

FIG. 10 illustrates one example method of determining content and displaying content on a device according to one or more aspects described herein. In step 1000, a location of a vehicle may be determined. The location of the vehicle may be determined using one or more of the methods described herein. Additionally or alternatively, the location of the vehicle may be determined via GPS or other data. In some examples, the location of the vehicle may be determined via V2V or V2I communications as the vehicle approaches another vehicle, device, infrastructure, etc.

In step 1002, a determination is made as to whether the determined vehicle location is within a predefined proximity of a first location. In some examples, the first location may be an electronic roadside display or other device configured to display content, as described herein. In other examples, the first location may be a location at which it is determined that display of content would be considered safe (e.g., a red light, heavy traffic area in which traffic is stopped, etc.). If, in step 1002, the vehicle is not within the predefined proximity of the first location, the process may return to step 1002 to determine the current location of the vehicle and again determine whether the current location is within the predefined proximity.

If, in step 1002, the vehicle is within the predefined proximity of the first location, a vehicle identifier (e.g., license plate number, VIN, etc.) may be retrieved in step 1004. For instance, a vehicle identifier may be captured by one or more cameras or other image capturing devices along a route on which the vehicle is travelling. In other examples, metadata from the location information received from the vehicle may be used to identify the vehicle (e.g., may be used as input in a look-up table to identify a VIN or the like).

In step 1006, a user associated with the vehicle may be determined or identified. In some examples, the vehicle identifier may be used as an input in a database query to retrieve a name or other identifier of a user associated with the vehicle. In other examples, driving behaviors (e.g., based on sensor data retrieved from one or more sensors within the vehicle, mobile device, or the like) may be used to identify a user. For instance, the driving behaviors may be compared against previously stored driving behaviors or patterns to identify a user associated with the behaviors.

In step 1008, user information may be retrieved. Similar to the arrangements described with respect to FIG. 6, the user information may be retrieved from one or more data source servers and may include purchase data, personal data, appointment or other calendar data, browsing history, credit information, and the like. In step 1010, first content may be determined based, at least in part, on the retrieved user information and may be displayed on a first device. The first content may be tailored to the identified user or interests of the identified user (e.g., based on the retrieved user information). In some examples, the first device may be an electronic roadside display at the first location. In other examples, the first device may be a mobile device of the user.

In step 1012, a response to the displayed content may be requested from the user. For instance, the displayed content may request that the user acknowledge the content (e.g., via his or her mobile device, on-board vehicle computing device, or the like). In step 1014, a determination is made as to whether a response is received from the user within a predefined time limit (e.g., within 15 seconds of displaying the content, within one minute of displaying the content, etc.). If so, second content may be determined and displayed on the first device in step 1020. The second content may include additional content or follow-up content from the first content. In other examples, the second content may include information instructing the user on one or more ways to obtain additional information if desired.

If, in step 1014, a response is not received within the predefined time limit, a second device may be identified in step 1016. The second device may be a mobile device of the user (e.g., determined from the user identifying information or other user information). For instance, if the first device is an electronic roadside display, the identified second device may be a mobile device of the user. In another example, if the first device is a mobile device of a user (e.g., a smartphone) the identified second device may be another mobile device of the user (e.g., a tablet). In still another example, if the first device is a mobile device of the user, the second device may be an electronic roadside display. In some arrangements, the second device may be a television, set-top box or other device associated with the user.

In step 1018, the first content may be transmitted to the second device and the system (e.g., the content determination and display server 110) may cause the content to be displayed on the second device.

Figure 11:
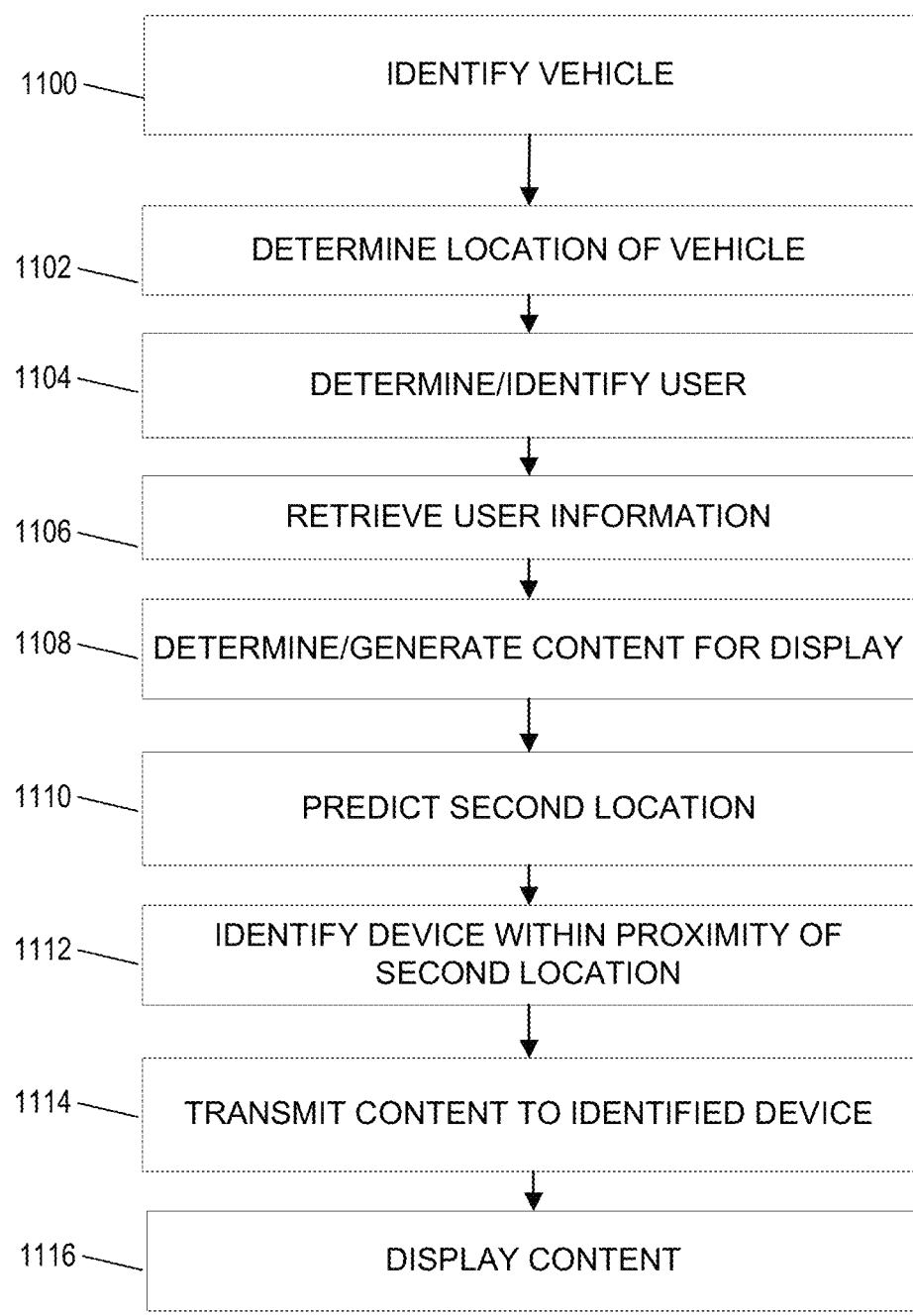
FIG. 11 illustrates another example method of determining and displaying content according to one or more aspects described herein.

FIG. 11 illustrates another example method of determining and displaying content according to one or more aspects described herein. In step 1100, a vehicle may be identified. Similar to other example arrangements discussed herein, the vehicle may be identified via a camera capturing an image of a license plate, via V2V or V2I communications, via a sensor detecting the vehicle along a route, or the like. In step 1102, a location of the vehicle may be determined. For instance, GPS or other location data from the vehicle may be received. In another example in which the vehicle is identified via a proximity sensor on a device or infrastructure, the location of the vehicle may be determined based on proximity to the sensor location.

In step 1104, a user associated with the vehicle may be determined or identified. For instance, vehicle identification information may be used as an input in a database query to identify the user associated with the vehicle. In step 1106, the user identifier may be used as an input in a query to obtain additional information about the user. For instance, as discussed with respect to FIG. 6, information about the user, as well as other information, may be retrieved from one or more data source servers. In some examples, the retrieved information may include appointment or calendar information for the user. Based on the retrieved information, content for display may be determined and/or generated in step 1108.

In step 1110, a future or second location of a user may be predicted. For instance, the retrieved appointment and/or calendar information may be used to determine a second location and approximate time the user will be at the second location (e.g., doctor's appointment at 2:00 p.m., oil change appointment at 11:00 a.m., etc.). In step 1112, a device within a predefined proximity of the second location may be identified (e.g., an electronic roadside display, mobile display, mobile device, etc.). For instance, the content determination and display server 110 may identify an electronic roadside display within a predefined proximity of the second location (e.g., one block, 1000 feet, etc.). In step 1114, the determined content may be transmitted to the identified device and, in step 1116, the determined content may be displayed on the device at the approximate time at which it is expected the user will be at the second location.

Figure 12:
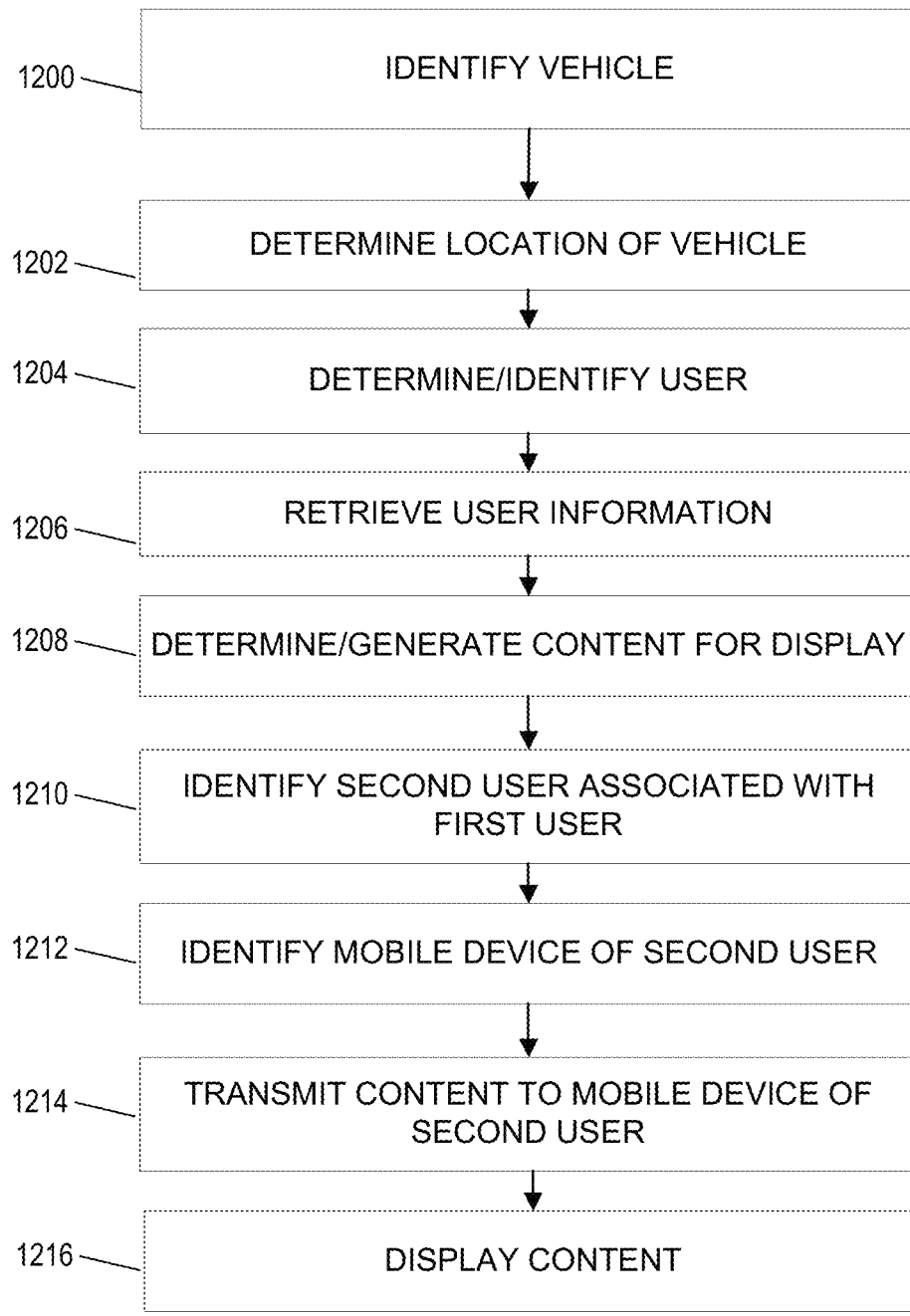
FIG. 12 illustrates yet another example method of determining and displaying content according to one or more aspect described herein.

FIG. 12 illustrates yet another method of determining and displaying content according to one or more aspects described herein. In step 1200, a vehicle may be identified. Similar to other example arrangements discussed herein, the vehicle may be identified via a camera capturing an image of a license plate, via V2V or V2I communications, via a sensor detecting the vehicle along a route, or the like. In step 1202, a location of the vehicle may be determined. For instance, GPS or other location data from the vehicle may be received. In another example in which the vehicle is identified via a proximity sensor on a device or infrastructure, the location of the vehicle may be determined based on proximity to the sensor location.

In step 1204, a user associated with the vehicle may be determined or identified. For instance, vehicle identification information may be used as an input in a database query to identify the user associated with the vehicle. In step 1206, the user identifier may be used as an input in a query to obtain additional information about the user. For instance, as discussed with respect to FIG. 6, information about the user, as well as other information, may be retrieved from one or more data source servers. In some examples, the retrieved information may include appointment or calendar information for the user. Based on the retrieved information, content for display may be determined and/or generated in step 1208.

In step 1210, a second user associated with the first user may be identified. For instance, the system may detect a presence of a second mobile device within a vehicle. In some examples, the second mobile device may be registered with the system (e.g., may be a device of a family member of the user or driver of the vehicle). In other examples, the system may retrieve user information that includes identification of a second mobile device, such as that of a spouse, child, close friend, or the like. This information may be pre-stored by the user.

In step 1212, a mobile device associated with the second user may be identified. For instance, a mobile device number or identifier may be retrieved or determined. In step 1214, the determined content may be transmitted to the mobile device of the second user and, in step 1216, the content determination and display server 810 may cause the content to be displayed on the mobile device of the second user. Accordingly, if the user is driving, the determined content may be transmitted to another user within the vehicle (e.g., a mobile device of a spouse, child, etc.) who can then convey the content to the user without the user reading the content directly.

Figure 13:
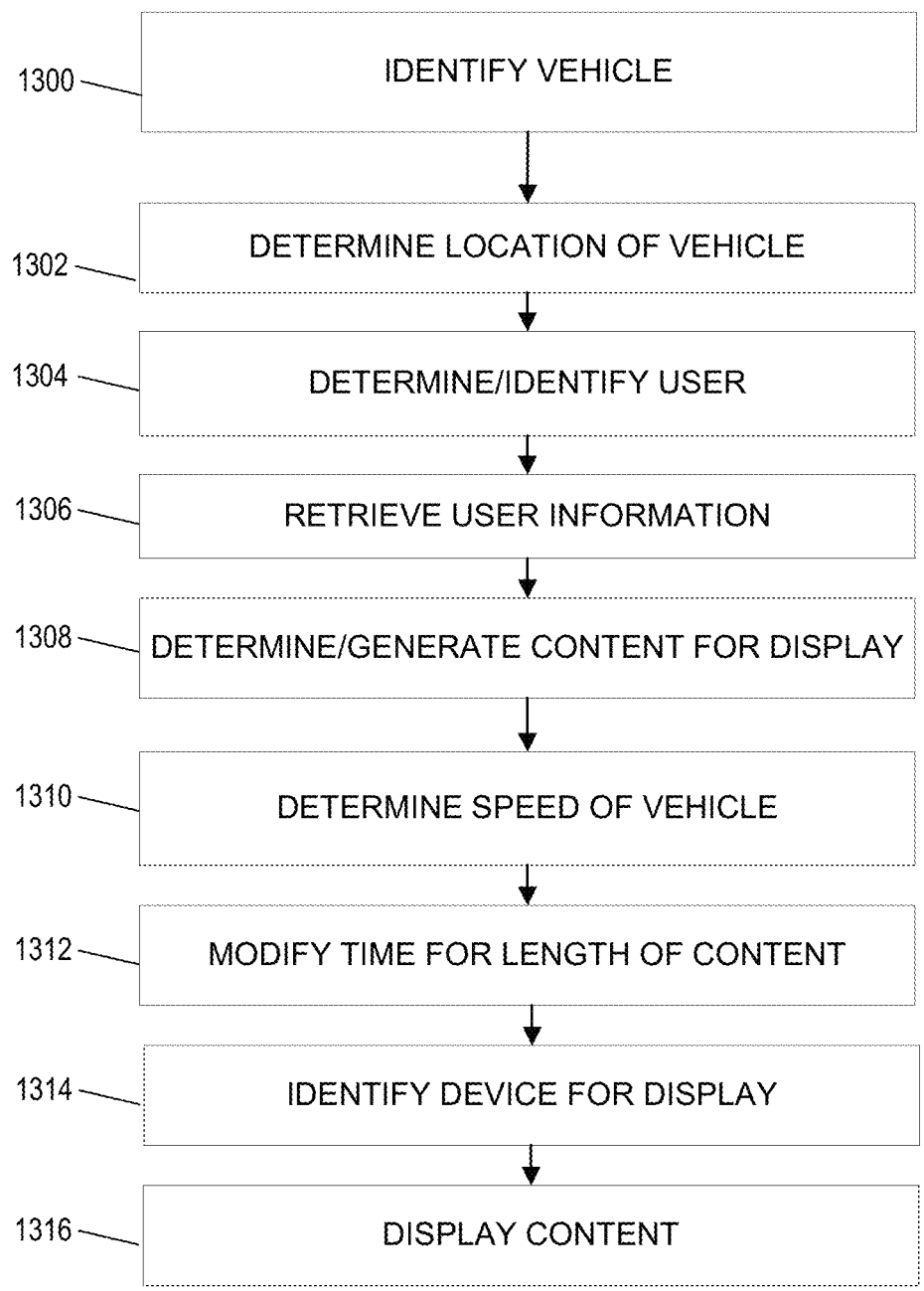
FIG. 13 is another example method of determining and displaying content according to one or more aspects described herein.

FIG. 13 illustrates still another example method of determining and displaying content according to one or more aspects described herein. In step 1300, a vehicle may be identified. Similar to other example arrangements discussed herein, the vehicle may be identified via a camera capturing an image of a license plate, via V2V or V2I communications, via a sensor detecting the vehicle along a route, or the like. In step 1302, a location of the vehicle may be determined. For instance, GPS or other location data from the vehicle may be received. In another example in which the vehicle is identified via a proximity sensor on a device or infrastructure, the location of the vehicle may be determined based on proximity to the sensor location.

In step 1304, a user associated with the vehicle may be determined or identified. For instance, vehicle identification information may be used as an input in a database query to identify the user associated with the vehicle. In step 1306, the user identifier may be used as an input in a query to obtain additional information about the user. For instance, as discussed with respect to FIG. 6, information about the user, as well as other information, may be retrieved from one or more data source servers. In some examples, the retrieved information may include appointment or calendar information for the user. Based on the retrieved information, content for display may be determined and/or generated in step 1308. In some example, determining or generating the content for display may include determining a length of time for which the content will be displayed on the device (e.g., 15 seconds, 30 seconds, one minute, etc.).

In step 1310, a speed of the vehicle may be determined. The speed may be determined from one or more sensors within the vehicle, from known speed limit data associated with the route or roadway along which the vehicle is travelling, current traffic conditions, and the like. Based on the determined speed of the vehicle, a length of time for which content will be displayed may be modified in step 1312. For instance, if it is determined that traffic volume is heavy and the vehicle is travelling below the posted speed limit, the length of time for which the content is displayed may be increased to provide additional information or viewing time for the user.

In step 1314, a device on which the content will be displayed may be identified. In some examples, the identified device may be an electronic roadside display at or near the identified location of the vehicle. In other examples, the identified device may be an electronic roadside display along a predicted route of the vehicle (e.g., based on navigation information, or the like). In still other examples, the identified device may be a mobile device of the user.

In step 1316, the content may be transmitted to the identified device and the content determination and display server may cause the content to be displayed on the identified device.

As discussed herein, various examples of generating or determining content and displaying content are provided. One or more aspects of the arrangements described herein with respect to the content determination and display server or system may be used in combination with any of the content output systems described herein, or may be used alone without departing from the invention.

As described herein, the content determination and display arrangements discussed permit use of enriched data to determine content and/or identify a device for display, time for display, length of display of content, and the like. For instance, data associated with a user may be retrieved from various sources (e.g., publicly available information, purchase history, calendar or appointment information, etc.) to generate customized content to display to a user, as well as, in at least some examples, to identify a device or location of a device at which to display the content.

In some examples, as discussed herein, vehicle data, such as a sensor data, may be used to modify content or length of display of content. For instance, the system may receive speed data associated with a vehicle and, based on the speed of the vehicle may generate content having a longer or shorter display time (e.g., short content when speed is higher, longer content when speeds are slower, etc.) or may modify a display time of generated content. In other arrangements, traffic volume, speed limits for the road, etc. may be retrieved from one or more data sources and may be used to generate a length of time of display or modify the content or length of time of display.

Further, aspects described herein provide additional safety measures when displaying content by identifying a passenger in a vehicle and transmitting content to a mobile device of the passenger, rather than the driver, in order to safely transmit content to the driver. Additionally or alternatively, content may be displayed while a vehicle is stopped, when a user has arrived at a destination, or on one more devices not associated with the vehicle (e.g., television, set-top box, mobile device, and the like).

The arrangements discussed herein provide for dynamic selection of a channel for distribution of content or display of content to a user based on user information, external factors, and the like. These arrangements aid in providing customized content to users in accessible locations, via convenient devices and at convenient times.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A computing device comprising:
one or more processors;
a display device; and
at least one memory storing non-transitory computer-readable instructions that, when executed by the one or more processors, cause the computing device to:
collect, by an executed application, driving data associated with an operation of a vehicle, the driving data comprising at least a determined location of the vehicle;
transmit, via a communication interface and to a second computing device, the collected driving data associated with the operation of the vehicle;
receive, from the second computing device, digital content for display on the display device, the digital content comprising a query associated with a roadside display of information based on one or more of the collected driving data, user data associated with an operator of the vehicle, and vehicle data collected from a roadside data collecting source;
receive, from a user of the computing device, a reaction to the query;
determine a current location of the vehicle and an estimated route of the vehicle from the current location to a destination associated with the roadside display of information; and
display second digital content on the display device, the second digital content based on the reaction to the digital content and comprising the estimated route of the vehicle to the destination associated with the roadside display of information.

2. The computing device of claim 1, wherein the roadside display of information comprises an advertisement, the destination associated with the roadside display of information comprising a business location.

3. The computing device of claim 1, wherein the received reaction comprises an input provided via the display device by the user of the computing device.

4. The computing device of claim 1, wherein the received reaction comprises an audio input provided by the user of the computing device.

5. The computing device of claim 1, wherein the driving data comprises trip data of a previous trip of the vehicle.

6. The computing device of claim 5, wherein the non-transitory computer-readable instructions, when executed by the one or more processors, further cause the computing device to:
determine, based on the trip data of a previous trip of the vehicle, a likelihood of the vehicle following the estimated route of the vehicle from the current location to the destination associated with the roadside display of information.

7. The computing device of claim 1, wherein the roadside display of information is selected based on an estimated time to the destination associated with the roadside display of information.

8. The computing device of claim 1, wherein the roadside display of information is selected based on an estimated distance to the destination associated with the roadside display of information.

9. A method for providing content to a device, the method comprising:
collecting, by an executed application of a first computing device, driving data associated with an operation of a vehicle, the driving data comprising at least a determined location of the vehicle;
transmitting, via a communication interface and to a second computing device, the collected driving data associated with the operation of the vehicle;
receiving, from the second computing device, digital content for display on a display device, the digital content comprising a query associated with a roadside display of information based on one or more of the collected driving data, user data associated with an operator of the vehicle, and vehicle data collected from a roadside data collecting source;
receiving, from a user of the computing device, a reaction to the query;
determining a current location of the vehicle and an estimated route of the vehicle from the current location to a destination associated with the roadside display of information; and
displaying second digital content on a display device of the first computing device, the second digital content based on the reaction to the digital content and comprising the estimated route of the vehicle to the destination associated with the roadside display of information.

10. The method of claim 9, wherein the roadside display of information comprises an advertisement, the destination associated with the roadside display of information comprising a business location.

11. The method of claim 9, wherein the received reaction comprises an input provided via the display device by the user of the computing device.

12. The method of claim 9, wherein the received reaction comprises an audio input provided by the user of the computing device.

13. The method of claim 9, wherein the driving data comprises trip data of a previous trip of the vehicle.

14. The method of claim 13 further comprising:
determining, based on the trip data of a previous trip of the vehicle, a likelihood of the vehicle following the estimated route of the vehicle from the current location to the destination associated with the roadside display of information.

15. The method of claim 9, wherein the roadside display of information is selected based on an estimated time to the destination associated with the roadside display of information.

16. The method of claim 9, wherein the roadside display of information is selected based on an estimated distance to the destination associated with the roadside display of information.

17. A non-transitory computer-readable storage medium having computer-executable program instructions stored thereon that when executed by a processor, cause a first computing device to perform:
collecting, by an executed application of a first computing device, driving data associated with an operation of a vehicle, the driving data comprising at least a determined location of the vehicle;
transmitting, via a communication interface and to a second computing device, the collected driving data associated with the operation of the vehicle;
receiving, from the second computing device, digital content for display on a display device, the digital content comprising a query associated with a roadside display of information based on one or more of the collected driving data, user data associated with an operator of the vehicle, and vehicle data collected from a roadside data collecting source;

receiving, from a user of the computing device, a reaction to the query;

determining a current location of the vehicle and an estimated route of the vehicle from the current location to a destination associated with the roadside display of information; and displaying second digital content on a display device of the first computing device, the second digital content based on the reaction to the digital content and comprising the estimated route of the vehicle to the destination associated with the roadside display of information.

18. The non-transitory computer-readable storage medium of claim 17, wherein the roadside display of information comprises an advertisement, the destination associated with the roadside display of information comprising a business location.

19. The non-transitory computer-readable storage medium of claim 17, wherein the received reaction comprises an input provided via the display device by the user of the computing device.

20. The non-transitory computer-readable storage medium of claim 17, wherein the received reaction comprises an audio input provided by the user of the computing device.

* * * * *